US012700346B2

(12) United States Patent
Park et al.

(10) Patent No.: US 12,700,346 B2
(45) Date of Patent: Aug. 4, 2026

(54) DISPLAY PANEL AND DISPLAY DEVICE INCLUDING THE SAME

(71) Applicant: LG Display Co., Ltd., Seoul (KR)

(72) Inventors: Chang Bae Park, Paju-si (KR); Woo Nam Jeong, Paju-si (KR); Hyeon Ho Son, Paju-si (KR); Hyun Cheol Jin, Paju-si (KR); Tae Young Jung, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 18/974,327

(22) Filed: Dec. 9, 2024

(65) Prior Publication Data

US 2025/0218351 A1 Jul. 3, 2025

(30) Foreign Application Priority Data

Dec. 27, 2023 (KR) ........................ 10-2023-0192978

(51) Int. Cl.
*G09G 3/32* (2016.01)

(52) U.S. Cl.
CPC ........... *G09G 3/32* (2013.01); *G02F 2201/52* (2013.01); *G09G 2300/0443* (2013.01); *G09G 2300/0452* (2013.01); *G09G 2300/0852* (2013.01); *G09G 2310/08* (2013.01); *G09G 2320/0233* (2013.01); *G09G 2320/0242* (2013.01); *G09G 2330/08* (2013.01)

(58) Field of Classification Search
CPC ............. G09G 3/32; G09G 2300/0443; G09G 2300/0852; G09G 2300/0452; G09G 2310/08; G09G 2320/0233; G09G 2320/0242; G09G 2330/08; G02F 2201/52

USPC .......................................................... 345/214
See application file for complete search history.

(56) References Cited

U.S. PATENT DOCUMENTS

2007/0070008 A1* 3/2007 Shin ..................... G09G 3/3648
345/89
2014/0204008 A1* 7/2014 Chu-Ke ............... G09G 3/2003
345/88

(Continued)

FOREIGN PATENT DOCUMENTS

CN 112562584 A 3/2021
JP 2010-127947 A 6/2010

(Continued)

OTHER PUBLICATIONS

Taiwan Intellectual Property Office, Office Action, Taiwanese Patent Application No. 113147706, Oct. 29, 2025, nine pages.

(Continued)

*Primary Examiner* — Tom V Sheng
(74) *Attorney, Agent, or Firm* — Fenwick & West LLP

(57) ABSTRACT

Embodiments disclose a display panel including a plurality of pixels, and a gate line and a data line that are connected to the plurality of pixels, wherein each of the plurality of pixels includes a 1-1 sub-pixel and a 1-2 sub-pixel of a first color, a 2-1 sub-pixel and a 2-2 sub-pixel of a second color, and a 3-1 sub-pixel and a 3-2 sub-pixel of a third color, wherein each of the 2-1 sub-pixel and the 2-2 sub-pixel includes a light-emitting element and a compensation circuit, and the compensation circuit of the 2-1 sub-pixel and the compensation circuit of the 2-2 sub-pixel are connected to one data line, and a display device including the same.

17 Claims, 14 Drawing Sheets

(56) References Cited

U.S. PATENT DOCUMENTS

| | | | | |
|---|---|---|---|---|
| 2014/0346475 | A1* | 11/2014 | Cho | H10D 86/423 |
| | | | | 438/4 |
| 2016/0240146 | A1* | 8/2016 | Lee | G09G 3/2003 |
| 2016/0240593 | A1* | 8/2016 | Gu | G09G 3/2074 |
| 2019/0228741 | A1 | 7/2019 | Su et al. | |
| 2020/0251038 | A1* | 8/2020 | Chien | G09G 5/395 |
| 2021/0158736 | A1* | 5/2021 | Kwak | G09G 3/20 |
| 2021/0183283 | A1* | 6/2021 | Park | G09G 3/006 |
| 2021/0183299 | A1* | 6/2021 | Park | G09G 3/2074 |
| 2021/0225244 | A1* | 7/2021 | Huang | G09G 3/20 |
| 2022/0375906 | A1* | 11/2022 | Kim | H10H 20/857 |
| 2022/0383811 | A1 | 12/2022 | Liu et al. | |
| 2023/0217767 | A1* | 7/2023 | Shin | H10D 86/60 |
| | | | | 257/40 |
| 2025/0089374 | A1* | 3/2025 | Park | H10D 86/441 |
| 2025/0089546 | A1* | 3/2025 | Ju | G09G 3/006 |

FOREIGN PATENT DOCUMENTS

| | | | |
|---|---|---|---|
| KR | 10-2019-0138179 | A | 12/2019 |
| KR | 10-2022-0131507 | A | 9/2022 |
| KR | 10-2023-0012089 | A | 1/2023 |
| TW | 202107699 | A | 2/2021 |
| TW | 202125492 | A | 7/2021 |

OTHER PUBLICATIONS

Japan Patent Office, Office Action, Japanese Patent Application No. 2024-226837, Jan. 13, 2026, seven pages.

\* cited by examiner

FIG. 16

VdataG

CL11    PC      PC    CL12

VDD

PIXEL(N)

SP1

SP2

ED

WP      WP

WP      WP

VDD

PIXEL(N+1)

SP4

SP3

ED

CL13    PC      PC    CL14

DISPLAY PANEL AND DISPLAY DEVICE INCLUDING THE SAME

CROSS-REFERENCE TO RELATED APPLICATION

This application claims priority to and the benefit of Republic of Korea Patent Application No. 10-2023-0192978, filed on Dec. 27, 2023, which is hereby incorporated by reference in its entirety.

BACKGROUND

1. Field of Technology

The present specification relates to a display panel and a display device including the same.

2. Discussion of Related Art

Organic light-emitting display devices reproduce images by allowing an organic light-emitting diode (OLED) disposed in each pixel to emit light in response to an input image signal. The organic light-emitting display device may have a quick response time, high luminous efficiency, high luminance, and a wide viewing angle and represent a black grayscale as perfect black, and thus has an excellent contrast ratio and color gamut. This organic light-emitting display device does not require a backlight unit.

In recent years, micro-display devices using light-emitting diodes (LEDs), which are inorganic light-emitting elements and manufactured in micro-sizes of about 100 μm or less, as light-emitting elements in a pixel are gaining attention as next-generation display devices. The LEDs are made of inorganic materials, and thus, do not require a separate encapsulation layer to protect organic materials from moisture and have excellent reliability and a longer lifespan than OLEDs. In addition, the LEDs can be turned on and off quickly, and have high light emission efficiency and impact resistance.

The problem with these micro-display devices is that two LEDs are disposed in parallel in a single sub-pixel, and thus when one of the LEDs experiences a short-circuit failure and is darkened, the other LED is also darkened.

SUMMARY

The present specification is directed to providing a display panel that allows the other light-emitting element to emit light even when one light-emitting element in one of a plurality of sub-pixels is darkened, and a display device including the same.

The present specification is also directed to providing a display panel in which a light-emitting element can be repaired and a display device including the same.

Objectives of the present specification are not limited to the objectives described above, and the other objectives which are not described above will be clearly understood by those skilled in the art from the following description.

According to an embodiment of the present invention, there is provided a display panel including a plurality of pixels, and a gate line and a data line that are connected to the plurality of pixels, wherein each of the plurality of pixels include a 1-1 sub-pixel and a 1-2 sub-pixel of a first color, a 2-1 sub-pixel and a 2-2 sub-pixel of a second color, and a 3-1 sub-pixel and a 3-2 sub-pixel of a third color, wherein each of the 2-1 sub-pixel and the 2-2 sub-pixel includes a light-emitting element and a compensation circuit, and the compensation circuit of the 2-1 sub-pixel and the compensation circuit of the 2-2 sub-pixel are connected to one data line.

BRIEF DESCRIPTION OF THE DRAWINGS

The above and other objects, features, and advantages of the present invention will become more apparent to those of ordinary skill in the art by describing exemplary embodiments thereof in detail with reference to the accompanying drawings, in which:

FIGS. 16 and 17 are diagrams illustrating a repair method in a display panel according to one embodiment of the present specification.

DETAILED DESCRIPTION

Figure 1:
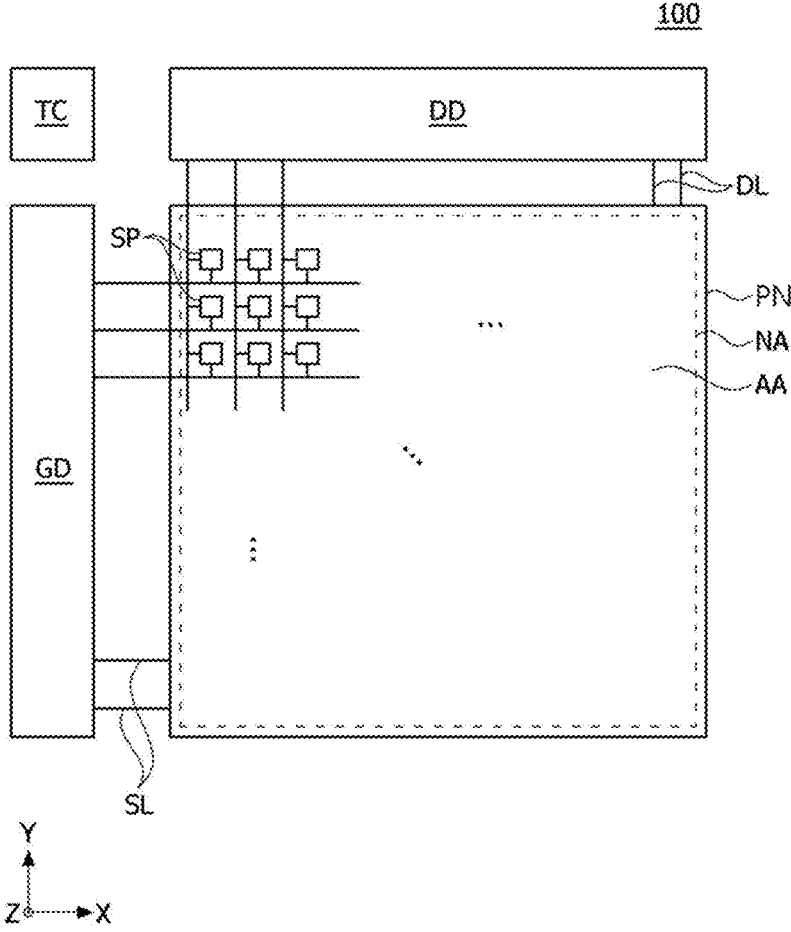
FIG. 1 is a block diagram schematically illustrating a configuration of a display device according to one embodiment of the present specification.

Advantages and features of the invention disclosed in the present specification and methods for accomplishing the same will be more clearly understood from embodiments described below with reference to the accompanying drawings. The present invention is not limited to the following embodiments but may be implemented in various different forms. The embodiments are provided only to complete the present invention and to fully provide a person having ordinary skill in the art to which the present invention pertains with the category of the present invention, and the present invention will be defined by the appended claims.

In describing the present invention, detailed descriptions of well-known technologies will be omitted when it is determined that they may unnecessarily obscure the gist of the present invention.

Terms such as "including," "having." and "composed of" used herein are intended to allow other elements to be added unless the terms are used with the term "only." When a component is expressed in the singular form, it may be construed as the plural form unless otherwise explicitly stated.

When the positional or interconnected relationship between two components is described using the terms such as "on," "above," "below," "next to," "connect or couple," "crossing or intersecting," and the like, one or more other components may be interposed between the two components unless the terms are used with the term "immediately" or "directly."

When the temporal order relationship is described using the terms such as "after," "subsequent to," "next," "before," and the like, a case which is not continuous may be included unless the term "immediately" or "directly" is used.

Although ordinal numbers such as first, second, and the like are used to distinguish between components, the functions or structures of these components are not limited by the ordinal numbers before the component or the name of the component.

The following embodiments may be partially or entirely coupled to or combined with each other and may be inter-operated and performed in technically various ways. Each of the embodiments may be independently operable with respect to each other and may be implemented together in related relationships.

In the embodiment of the present specification, pixels and a display panel driving circuit include transistors. The transistors are three-electrode elements including a gate, a source, and a drain. The source is an electrode that provides carriers to the transistor. The carriers in the transistor start to flow from the source. The drain is an electrode through which the carriers are discharged from the transistor to the outside. In the transistor, the carriers flow from the source to the drain. In the case of an n-channel transistor, carriers are electrons, and thus a source voltage is lower than a drain voltage so that the electrons flow from the source to the drain. In the n-channel transistor, current flows from the drain to the source. In the case of a p-channel transistor, carriers are holes, and thus a source voltage is higher than a drain voltage so that the holes flow from the source to the drain. In the p-channel transistor, since the holes flow from the source to the drain, current flows from the source to the drain. It should be noted that the source and the drain of the transistor are not fixed in position. For example, the source and the drain are interchangeable depending on the applied voltage. Accordingly, the present specification is not limited by the source and the drain of the transistor. In the following description, the source and the drain of the transistor will be referred to as a first electrode and a second electrode.

A gate signal may swing between a gate-on voltage and a gate-off voltage. The transistor is turned on in response to the gate-on voltage and turned off in response to the gate-off voltage. In the case of an n-channel transistor, the gate-on voltage may be a gate-high voltage VGH, and the gate-off voltage may be a gate-low voltage VGL. In the case of a p-channel transistor, the gate-on voltage may be the gate-low voltage VGL, and the gate-off voltage may be the gate-high voltage VGH.

The term "line" mentioned in the embodiments of the present specification may be interpreted as a wiring to which a signal or voltage is applied.

The terms used in the embodiments of the present specification (including technical and scientific terms) may be interpreted with meanings that are generally understood by those skilled in the art unless particularly defined and described, and terms which are generally used, such as terms defined in a dictionary, may be understood in consideration of their contextual meanings in the related art.

Hereinafter, exemplary embodiments of the present invention will be described in detail with reference to the accompanying drawings.

Referring to FIG. 1, a display device 100 includes a display panel PN including a display area AA in which a plurality of pixels are disposed, and a display panel driving circuit configured to drive the pixels.

The display panel PN may be a panel having a rectangular structure with a length in an X-axis direction, a width in a Y-axis direction, and a thickness in a Z-axis direction, but the present specification is not limited thereto. Each of the pixels includes a plurality of sub-pixels SP of different colors. The display area AA on which an input image is displayed in the display panel PN may be a screen viewed from the front of the display panel PN.

The display panel driving circuit includes a data driver DD, a gate driver GD, and a timing controller TC configured to control the gate driver GD and the data driver DD.

An input image is displayed on the sub-pixels SP disposed in the display area AA of the display panel PN. Each of the sub-pixels SP includes a light-emitting element and a pixel circuit configured to drive the light-emitting element. The light-emitting element may be a light-emitting diode (LED) or a micro-LED.

On the display panel PN, a plurality of gate lines SL and a plurality of data lines DL are disposed to cross each other. Each of the sub-pixels SP is connected to the gate line SL and the data line DL. Power lines omitted from FIG. 1 may be connected to each of the sub-pixels SP. In the display panel PN, a non-display area NA may be disposed outside the display area AA.

The gate driver GD supplies a gate signal to the gate lines SL in response to a gate control signal provided from the timing controller TC. The gate driver GD may be disposed at least in the non-display area NA of the display panel PN as shown in FIG. 1 or may be disposed in the display area AA.

The data driver DD converts image data received from the timing controller TC into a gamma compensation voltage in response to a data control signal provided from the timing controller TC to output a data voltage. The data voltage output from the data driver DD is supplied to the data lines DL.

The timing controller TC aligns image data input from the outside and supplies the image data to the data driver DD. The timing controller TC may generate the gate control signal and the data control signal based on timing signals that are synchronized with the input image signal, such as a dot clock signal, a data enable signal, and a horizontal/vertical synchronization signal. The timing controller TC supplies the gate control signal and the data control signal to the gate driver GD and the data driver DD, respectively, to control operation timings of the gate driver GD and the data driver DD.

Link lines and pad electrodes for transmitting signals to the sub-pixels SP of the display area AA may be disposed in the non-display area NA. One or more of a gate driver IC in which circuits of the gate driver GD are integrated and a data driver IC in which circuits of the data driver DD are integrated may be disposed in the non-display area NA. The non-display area NA may include a rear surface of the display panel PN, that is, the rear surface on which the sub-pixel SP does not present. The non-display area NA can be minimized to the extent that the non-display area NA is not visible when an image is displayed on the display panel PN.

The display panel driving circuit can be connected to the display panel PN by various ways to drive the pixels. For example, the gate driver GD may be disposed by a gate in panel (GIP) method in the non-display area NA or disposed by a gate in display area (GIA) method between the plurality of sub-pixels SP in the display area AA. The data driver DD and the timing controller TC may be formed on a separate flexible film and printed circuit board (PCB) and may be electrically connected to the display panel PN by bonding terminals of the flexible film to pad electrodes formed in the non-display area NA of the display panel PN. The flexible film bonded to the display panel PN may be connected to the PCB on which circuit elements are mounted and lines are formed.

Figure 2:
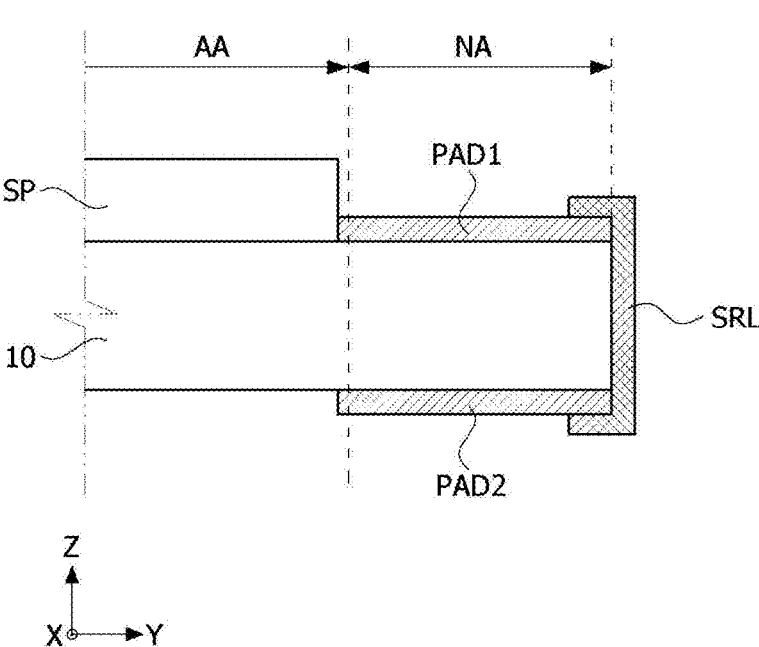
FIG. 2 is a partial cross-sectional view illustrating a pad electrode and a side line disposed on an outer periphery of a display panel according to one embodiment of the present specification.

A side line for connecting a signal line on a front surface of the display panel PN to a pad electrode on the rear surface of the display panel PN may be formed on an outer peripheral side surface of the display panel PN. The method of electrically connecting the front and rear surfaces of the display panel PN through the side line can minimize the non-display area NA as viewed from the front surface of the display panel PN. In FIG. 2, "SRL" represents the side line. When the gate driver GD, the data driver DD, and the timing controller TC are electrically connected to the display panel PN by the above-described method, a substantially bezel-less screen can be implemented on the display panel PN.

Referring to FIG. 2, a plurality of pad electrodes for transmitting various signals to the sub-pixels SP are disposed in the non-display area NA of the display panel PN. For example, a first pad electrode PAD1 configured to transmit signals to the sub-pixels SP may be disposed in the non-display area NA disposed on the front surface of the display panel PN. A second pad electrode PAD2 electrically connected to circuit elements such as the flexible film and the PCB are disposed in the non-display area NA disposed on the rear surface of the display panel PN. The non-display area NA disposed on an outer periphery of the front surface of the display panel PN, on which an image is displayed, may be minimized in size by disposing only a pad area in which the first pad electrode PAD1 is disposed.

Various signal lines connected to the sub-pixels SP, for example, the gate line SL or the data line DL, may extend to the non-display area NA to be electrically connected to the first pad electrode PAD1.

The display panel PN may include a side line SRL disposed on the outer peripheral side surface of the display panel PN. The side line SRL may electrically connect the first pad electrode PAD1, which is disposed on the outer periphery of the front surface of the display panel PN, to the second pad electrode PAD2, which is disposed on the an outer periphery of the rear surface of the display panel PN, across the side surface of the display panel PN. Signals output from the circuit elements disposed on the rear surface of the display panel PN may be transmitted to the sub-pixels SP in the display area AA and the gate driver GD via the second pad electrode PAD2, the side line SRL, and the first pad electrode PAD1. Accordingly, an area of the non-display area NA at the front surface of the display panel PN can be minimized by forming a signal transmission path that crosses the outer peripheries of the front, side, and rear surfaces of the display panel PN.

A plurality of display modules may be combined on a plane to be implemented as a large-screen tiling display device. Each of the display modules may be implemented as a single display device, and the combination of the plurality of display modules may be implemented as a large-screen tiling display device. Each of the display modules includes one display panel PN, a driving circuit of the display panel PN, and circuit elements and module cover members coupled to the rear surface of the display panel PN.

Figure 3:
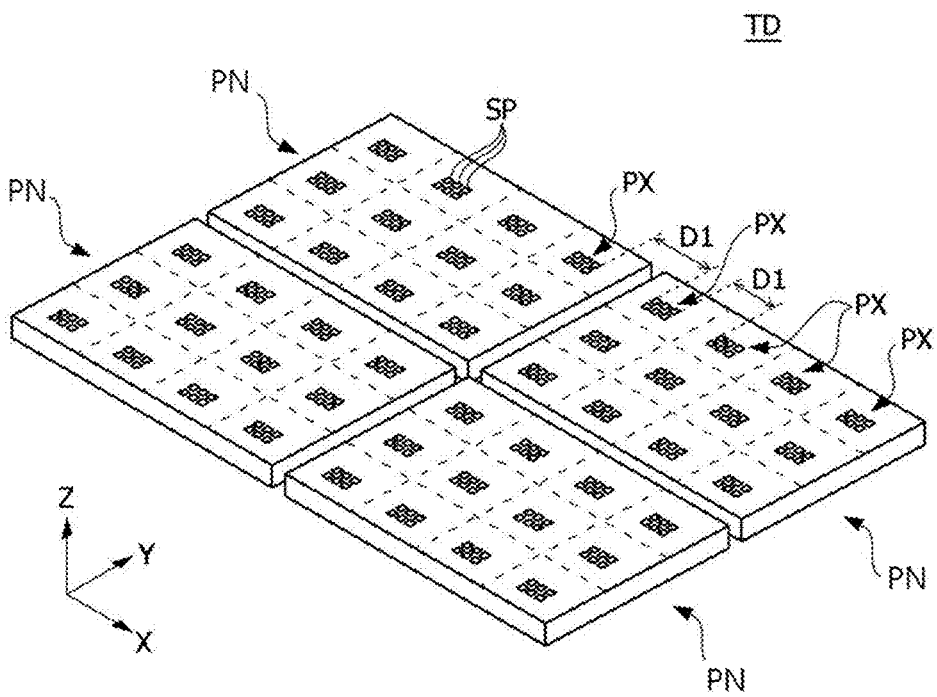
FIG. 3 is a perspective view illustrating a tiling display device according to one embodiment of the present specification.

Referring to FIG. 3, a large-screen tiling display device TD includes a plurality of display modules disposed on an XY plane. Each of the display modules includes the display panel PN that reproduces an input image. When the non-display area NA is minimized at the outer periphery of the front surface of each of the display panels PN, a large-screen image may be reproduced with no visible seam between the adjacent display panels PN.

The display panels PN may be assembled on a plane such that a separation distance D1 between an outermost pixel PX of one display panel PN and an outermost pixel PX of another display panel PN adjacent to the one display panel PN is substantially equal to a separation distance D2 between the adjacent pixels PX in the display area AA of the display panel PN. As a result, the separation distances D1 and D2 between the adjacent pixels PX are equal to each other throughout the large-screen display areas of the tiling display device TD, thereby ensuring that a seam area is not visually recognized.

In the tiling display device TD, the plurality of display modules may share one timing controller TC. A host system may be connected to a plurality of timing controllers TC to transmit a video signal, which is to be reproduced on all the display panels PN that implement the large-screen tiling display device TD, to the timing controllers TC and to synchronize the timing controllers TC.

Figure 4:
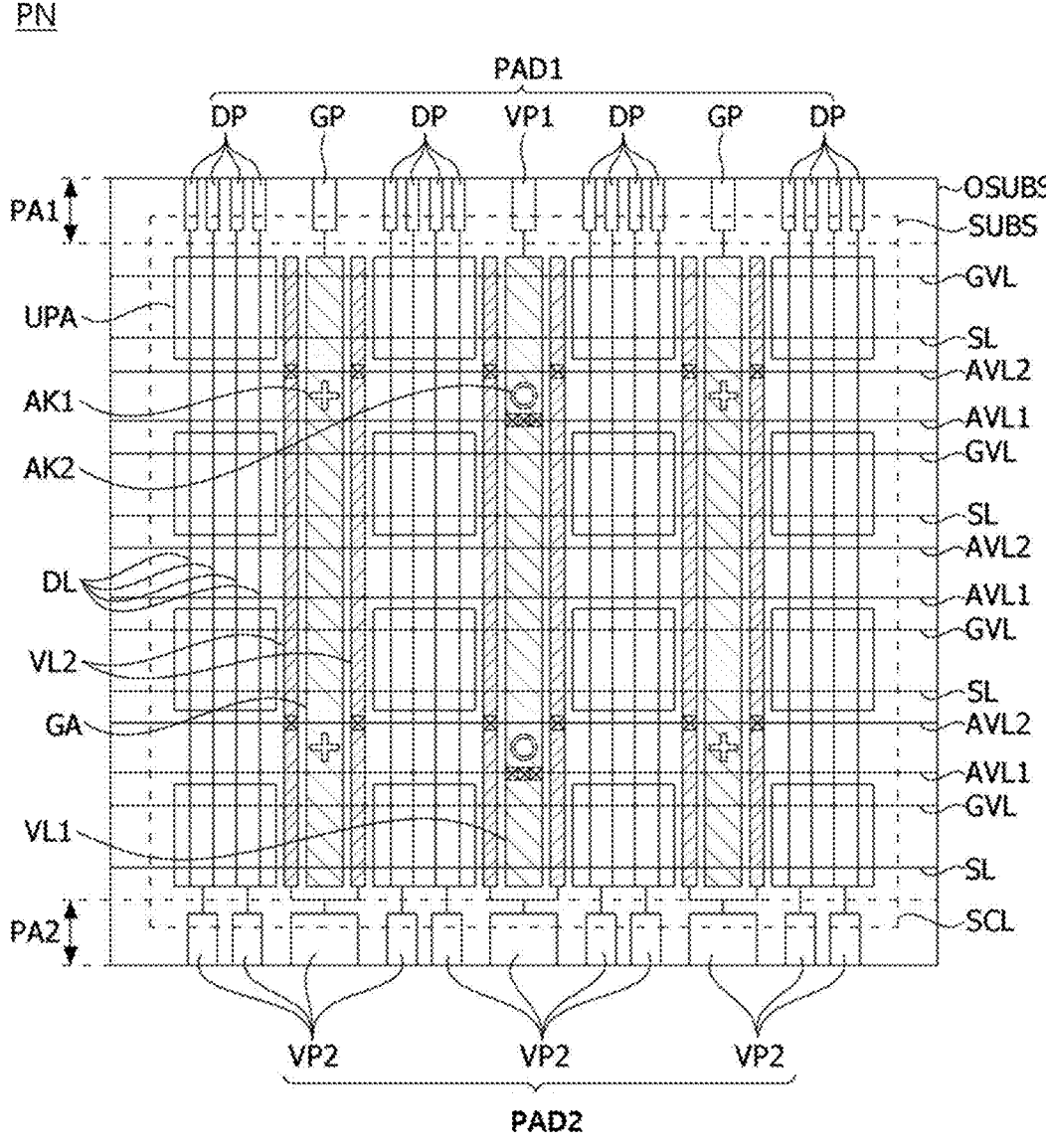
FIG. 4 is a plan view illustrating a planar structure of the display panel according to one embodiment of the present specification.

FIG. 4 is a plan view schematically illustrating a planar structure of the display panel according to one embodiment of the present specification.

Referring to FIG. 4, the display panel PN includes a substrate SUBS on which a pixel array and the circuits of the gate driver GD are disposed. The display panel PN may be a panel having a rectangular structure with a length in a row direction (an X-axis direction), a width in a column direction (a Y-axis direction), and a thickness in a thickness direction (a Z-axis direction), but the present specification is not limited thereto.

The substrate SUBS may be an insulating substrate that supports components disposed on an upper portion of the display device. The substrate SUBS may have a structure in which a plurality of substrates are stacked. The substrate SUBS may be made of a glass, polymer resin, or plastic substrate.

On one surface (or a front surface) of the substrate SUBS, the display area AA may include a plurality of pixel areas UPA, a plurality of gate driving areas GA, and a plurality of pad areas PA1 and PA2. One or more pixels PX may be disposed in each of the pixel areas UPA. The pixel areas UPA may be disposed along a plurality of row lines and a plurality of column lines. Each of the pixels PX includes a plurality of sub-pixels SP of different colors. Each of the sub-pixels SP includes a light-emitting element and a pixel circuit, and thus may emit light independently. The sub-pixels SP may include a red sub-pixel, a blue sub-pixel, a green sub-pixel, and the like, but the present specification is not limited thereto.

The plurality of gate driving areas GA include the circuits of the gate driver GD. The gate driving area GA may be formed in the row direction and/or the column direction between the plurality of pixel areas UPA. The gate driver GD formed in the gate driving area GA may provide a gate signal to the plurality of gate lines SL. The gate driving area GA may be disposed between the adjacent pixel areas UPD in the row direction (the X-axis direction).

A first pad area PA1 includes a plurality of first pad electrodes PAD1 disposed on an outer periphery of the front surface of one side (or an upper side) of the display panel PN. The first pad electrodes PAD1 may transmit various signals to various lines extending in the column direction in the display area AA. The first pad electrodes PAD1 include data pads DP connected to the data lines DL to transmit the data voltage output from the data driver DD to the data lines DL, and gate pads GP connected to the gate driver GD to transmit a clock signal, a start signal, a gate-low voltage, a gate-high voltage, and the like to the gate driver GD to drive the gate driver GD. The clock signal, the start signal, the gate-low voltage, the gate-high voltage, and the like to drive the gate driver GD may be generated from the timing controller TC and applied to the gate pads GP via a level shifter and the PCB. The first pad electrodes PAD1 may include a plurality of power lines to which a direct current (DC) voltage (or constant voltage) is applied.

The substrate SUBS of the display panel PN includes gate driving lines, which are connected to the gate pads GP in the column direction, and a plurality of gate driving lines GVL extending in the row direction. The gate driving lines in the column direction may be connected to the gate driving lines GVL in the row direction via contact holes passing through an insulating film. The gate driving lines GVL transmit signals necessary for driving the gate driver GD distributed in the gate driving areas GA, such as the clock signal, the start signal, the gate-high voltage, the gate-low voltage, and the like, to the circuits of the gate driver GD.

A second pad area PA2 includes a plurality of second pad electrodes PAD2 disposed on an outer periphery of the front surface of the other (or a lower side) of the display panel PN. The second pad area PA2 may include a plurality of low-potential power pads VP2.

A direct current (DC) voltage applied to the power lines may be output from a power circuit omitted from the drawing and applied to power pads VP1 and VP2 connected to the power lines via the PCB. The power circuit may be a DC-DC converter that is disposed on the PCB or control boards CTB1 and CTB2 disposed on the rear surface of the display panel PN and converts a DC input voltage output from a main power supply into a DC voltage suitable for driving the display panel PN.

The power pads VP1 and VP2 connected to the power lines may include a plurality of high-potential power pads VP1 disposed on the first pad area PA1 to transmit a high-potential power voltage to a high-potential power line VL1, and the plurality of low-potential power pads VP2 disposed on the second pad area PA2 to transmit a low-potential power voltage to a low-potential power line VL2.

The data pads DP, which are connected one-to-one to the data lines DL, may each have a relatively narrow width, and the power pads VP1 and VP2 and the gate pads GP may each have a relatively wide width. The low-potential power pads VP2 may each have a greater width than each of the high-potential power pads VP1.

In order to minimize the outermost non-display area NA of the display panel PN, the pixel array, the lines, and the pads are formed on the front surface of the substrate of the display panel PN, and then, the outermost portion beyond a scribing line SCL, indicated by a dotted line, is removed, so that a substrate SUBS with a minimized non-display area NA can be prepared. After the scribing process, rough edges on an outer periphery of the substrate SUBS may be ground or laser-trimmed. Short pad electrodes PAD1 and PAD2 remain on the outer periphery of the front surface of the substrate SUBS, which has been reduced in size accordingly.

The data lines DL may extend in the column direction (Y direction) on the substrate SUBS and overlap the pixel area UPA. The data lines DL supply the data voltage to the pixel circuit of each of the sub-pixels SP. The gate lines SL may extend in the row direction (X direction) on the substrate SUBS of the display panel PN and overlap the pixel area UPA and the gate driving area GA. The gate lines SL may cross the pixel areas UPA and the gate driving areas GA and supply the gate signal output from the gate driver GD to the pixel circuit of each of the sub-pixels SP.

High-potential power lines VL1 extend in the column direction (Y direction), and one or more thereof are connected in a mesh structure to auxiliary high-potential power lines AVL1 extending in the row direction (X direction). The auxiliary high-potential power lines AVL1 are connected to the sub-pixels SP disposed in the row direction (X direction). Accordingly, the high-potential power voltage applied to the high-potential power lines VL1 may be transmitted to the sub-pixels SP via the auxiliary high-potential power lines AVL1.

Low-potential power lines VL2 extend in the column direction (Y direction), and one or more thereof are connected in a mesh structure to auxiliary low-potential power lines AVL2 extending in the row direction (X direction). The auxiliary low-potential power lines AVL2 are connected to the sub-pixels SP disposed in the row direction (X direction). Accordingly, the sub-pixels SP are connected to the auxiliary low-potential power lines AVL2 to which the low-potential power voltage is applied.

Due to the mesh structure of the power lines, a resistance of the power line may be reduced, which can reduce a voltage drop across the high-potential power voltage and variations in the power voltage within the display area AA.

The substrate SUBS of the display panel PN may include one or more alignment keys AK1 and AK2 disposed between the pixel areas UPA. The alignment keys AK1 and AK2 may be used for alignment during the manufacturing process of the display panel PN. A first alignment key AK1 may be disposed in the gate driving area GA. The first alignment key AK1 may be used to check an alignment position of each of the light-emitting elements. The first alignment key AK1 may be formed in a cross pattern, but the present specification is not limited thereto. A second alignment key AK2 may overlap the high-potential power line HL. The high-potential power line HL may be distinguished from the second alignment key AK2 by including a hole formed at a position that overlaps the second alignment key AK2. The second alignment key AK2 may be used to align the display panel PN to a donor substrate. The donor substrate is an intermediate medium for mounting light-emitting elements on the substrate SUBS of the display panel PN. A plurality of light-emitting elements manufactured on a semiconductor wafer may be attached to and transferred to the donor substrate, and the light-emitting elements attached to the donor substrate may be transferred onto the substrate SUBS. The second alignment key AK2 may be formed in a circular or ring pattern, but the present specification is not limited thereto.

Figure 5:
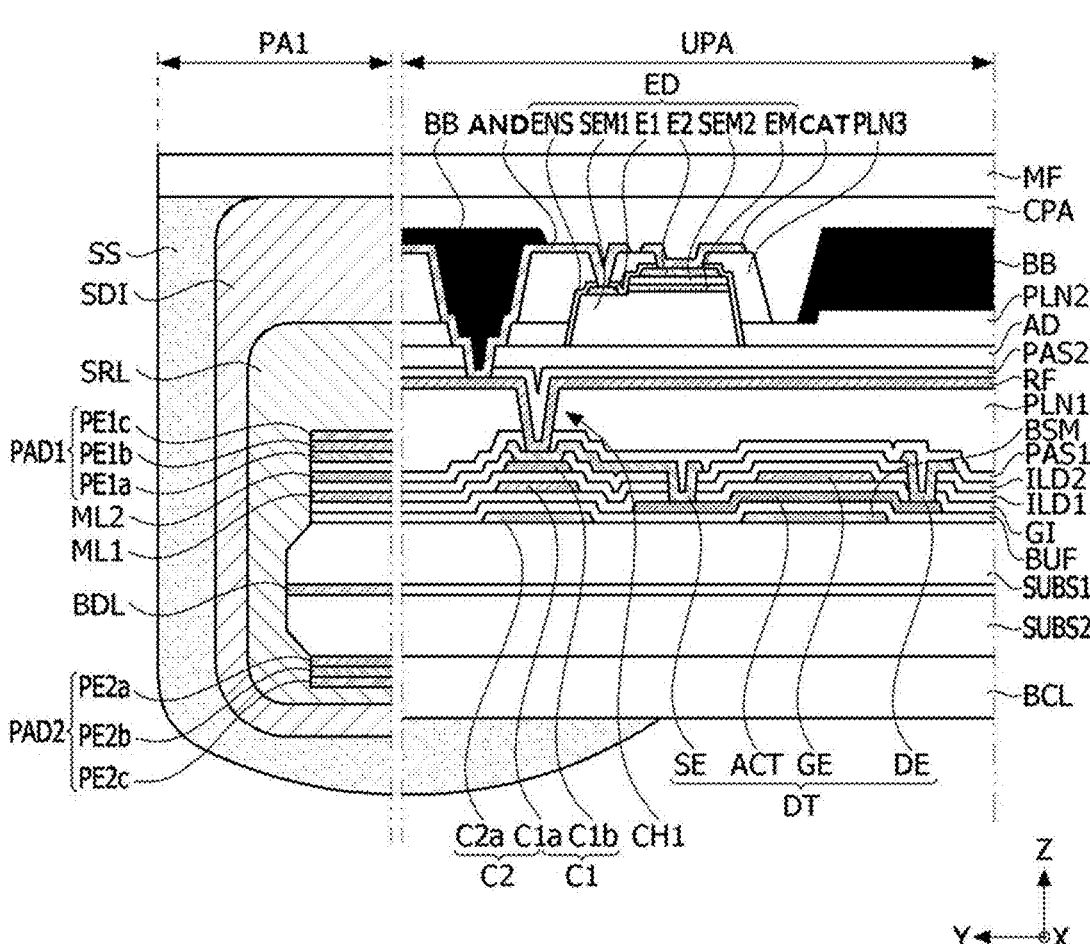
FIG. 5 is a cross-sectional view illustrating a cross-sectional structure of the display panel according to one embodiment of the present specification.

FIG. 5 is a cross-sectional view illustrating a cross-sectional structure of the display panel according to one embodiment of the present invention.

Referring to FIG. 5, a pixel circuit for driving a light-emitting element ED is disposed in each of the plurality of sub-pixels SP on the first substrate SUBS1. The pixel circuit may include a plurality of thin-film transistors and one or more capacitors. For convenience of description, a driving element DT, a first capacitor C1, and a second capacitor C2 used in the pixel circuit are described, but the display panel PN may further include other circuit elements.

A pattern of a first metal layer may be disposed on the first substrate SUBS1. The pattern of the first metal layer may include a light-blocking layer BSM. The light-blocking layer BSM may minimize or at least reduce leakage current by blocking light incidents on an active layer ACT of the driving element DT. The light-blocking layer BSM may be formed of an opaque conductive material, e.g., a metal such as copper (Cu), aluminum (Al), molybdenum (Mo), nickel (Ni), titanium (Ti), chromium (Cr), an alloy of these metals, or a multi-layered metal layer.

A buffer layer BUF may be disposed on the light-blocking layer BSM. The buffer layer BUF may block penetration of moisture or impurities through the first substrate SUBS1. The buffer layer BUF may be formed of silicon oxide (SiOx), silicon nitride (SiNx), or multi-layered insulating layers.

The driving element DT including the active layer ACT, a gate electrode GE, a source electrode SE, and a drain electrode DE may be disposed on the buffer layer BUF.

The active layer ACT may be made of a semiconductor material such as an oxide semiconductor, amorphous silicon, or polysilicon, but the present invention is not limited thereto. A gate insulating layer GI electrically insulates the active layer ACT from the gate electrode GE of the driving element DT. The gate insulating layer GI may be formed of silicon oxide (SiOx), silicon nitride (SiNx), or multi-layered insulating layers.

A pattern of a second metal layer may be disposed on the gate insulating layer GI. The pattern of the second metal layer may include the gate electrode GE of the driving element DT. The second metal layer may be formed of copper (Cu), aluminum (Al), molybdenum (Mo), nickel (Ni), titanium (Ti), chromium (Cr), or multi-layered metal layers.

A first interlayer insulating layer ILD1 and a second interlayer insulating layer ILD2 are disposed on the gate electrode GE. In the first interlayer insulating layer ILD1 and the second interlayer insulating layer ILD2, contact holes are formed for each of the source electrode SE and drain electrode DE of the driving element DT to connect to the active layer ACT. Each of the first interlayer insulating layer ILD1 and the second interlayer insulating layer ILD2 may be formed of silicon oxide (SiOx), silicon nitride (SiNx), or multi-layered insulating layers.

A pattern of a third metal layer may be disposed on the second interlayer insulating layer ILD2. The pattern of the third metal layer may include the source electrode SE and the drain electrode DE, which overlap the active layer ACT and are connected to the active layer ACT through the contact holes passing through the interlayer insulating layers ILD1 and ILD2. The source electrode SE may be connected to the capacitors C1 and C2 and a first electrode E1 of the light-emitting element ED. The third metal layer may be formed of copper (Cu), aluminum (Al), molybdenum (Mo), nickel (Ni), titanium (Ti), chromium (Cr), or multi-layered metal layers.

The first capacitor C1 includes a first capacitor electrode C1a and a second capacitor electrode C1b. The first capacitor electrode C1a may be formed as the pattern of the second metal layer disposed on the gate insulating layer GI. The second capacitor electrode C1b is formed as a pattern of a fourth metal layer disposed on the first interlayer insulating layer ILD1 and overlaps the first capacitor electrode C1a with the first interlayer insulating layer ILD1 interposed therebetween. The second capacitor electrode C1b may be connected to the source electrode SE of the driving element DT. The fourth metal layer may be formed of copper (Cu), aluminum (Al), molybdenum (Mo), nickel (Ni), titanium (Ti), chromium (Cr), or multi-layered metal layers.

The second capacitor C2 includes a third capacitor electrode C2a that overlaps the first capacitor electrode C1a with the buffer layer BUF and the gate insulating layer GI interposed therebetween. The third capacitor electrode C2a may be formed as the pattern of the first metal layer disposed on the first substrate SUBS1.

The second capacitor C2 is electrically connected between the source electrode SE of the driving element DT and the light-emitting element ED to increase a capacitance of the light-emitting element ED, which may increase brightness when the light-emitting element ED emits light.

A first passivation layer PAS1 covers the pattern of the third metal layer and the second interlayer insulating layer ILD2 so as to overlay the pattern of the third metal layer. The first passivation layer PAS1 may be formed of silicon oxide (SiOx), silicon nitride (SiNx), or multi-layered insulating layers.

A first planarization layer PLN1 is disposed on the first passivation layer PAS1. The first planarization layer PLN1 covers the first passivation layer PAS1 to planarize the surface on which the light-emitting element is disposed. The first planarization layer PLN1 may be a thick, single-layered or multi-layered organic insulating layer made of benzocyclobutene or acryl-based organic material.

A pattern of a fifth metal layer may be disposed on the first planarization layer PLN1. The pattern of the fifth metal layer may include a reflective layer RF. The reflective layer RF reflects light from the light-emitting element ED toward a front surface of the display panel PN to increase light efficiency and may be used as an electrode to connect the light-emitting element ED to the pixel circuit or power line. The reflective layer RF may be electrically connected to the source electrode SE of the driving element DT and the first capacitor C1 through a contact hole CH1 passing through the first planarization layer PLN1 and the first passivation layer PAS1. In addition, the reflective layer RF may be electrically connected to the first electrode E1 of the light-emitting element ED through an anode AND or may electrically connect a second electrode E2 of the light-emitting element ED to a high-potential power line HL. The fifth metal layer may be formed of silver (Ag), aluminum (Al), molybdenum (Mo), titanium (Ti), a transparent electrode material such as indium tin oxide (ITO), or multi-layered metal layers.

A second passivation layer PAS2 covers the pattern of the fifth metal layer and the first planarization layer PLN1. The second passivation layer PAS2 may be formed of silicon oxide (SiOx), silicon nitride (SiNx), or multi-layered insulating layers.

An adhesive layer AD may be disposed on the second passivation layer PAS2 to fix the light-emitting element ED. The adhesive layer AD may be formed of a photocurable resin that may be cured by light. The adhesive layer AD may be formed of an acryl-based material containing a photosensitive agent, but the present invention is not limited thereto. The adhesive layer AD may be formed on the entire surface of the first substrate SUBS1 excluding the pad areas PA1 and PA2 in which the first pad electrode PAD1 is to be disposed.

The light-emitting element ED of each of the sub-pixels SP may be disposed on the adhesive layer AD. Each of the light-emitting elements ED may emit light by a current from the driving element DT. The light-emitting elements ED may include a red light-emitting element ED, a green light-emitting element ED, and a blue light-emitting element ED. The light-emitting element ED may be an LED or a micro-LED.

Each of the light-emitting elements ED includes a first semiconductor pattern SEM1, a light-emitting layer EM, a second semiconductor pattern SEM2, the first electrode E1, and the second electrode E2.

The first semiconductor pattern SEM1 is disposed on the adhesive layer AD, and the second semiconductor pattern SEM2 is disposed on the first semiconductor pattern SEM1. The first semiconductor pattern SEM1 and the second semiconductor pattern SEM2 may be formed as semiconductor patterns obtained by doping a semiconductor material with n-type and p-type impurities. For example, each of the first semiconductor pattern SEM1 and the second semiconductor pattern SEM2 may be a layer formed by doping materials such as gallium nitride (GaN), indium aluminum phosphide (InAlP), gallium arsenide (GaAs), and the like with n-type or p-type impurities. In addition, the p-type impurities may be magnesium, zinc (Zn), beryllium (Be), or the like, and the n-type impurities may be silicon (Si), germanium, tin (Sn), or the like, but the present invention is not limited thereto.

The light-emitting layer EM is disposed between the first semiconductor pattern SEM1 and the second semiconductor pattern SEM2. The light-emitting layer EM may emit light by receiving holes and electrons from the first semiconductor pattern SEM1 and the second semiconductor pattern SEM2. The light-emitting layer EM may be formed as a single layer or a multi-quantum well (MQW) structure, and may be formed of, for example, indium gallium nitride (InGaN), gallium nitride (GaN), or the like.

The first electrode E1 is disposed on the first semiconductor pattern SEM1. The first electrode E1 electrically connects the driving element DT and the first semiconductor pattern SEM1. The first semiconductor pattern SEM1 may be formed of a semiconductor layer doped with n-type impurities. The first electrode E1 may be an anode of the light-emitting element ED that is disposed on the first semiconductor pattern SEM1 and electrically connected to the driving element DT and the capacitors C1 and C2 via the reflective layer RF. The first electrode E1 may be disposed on an upper surface of a first semiconductor layer SEM1. The first electrode E1 may be formed of a conductive material, for example, a transparent conductive material such as indium tin oxide (ITO) or indium zinc oxide (IZO), or an opaque conductive material such as titanium (Ti), gold (Au), silver (Ag), copper (Cu), or an alloy thereof.

The second electrode E2 is disposed on the second semiconductor pattern SEM2. The second electrode E2 electrically connects the high-potential power line HL and a second semiconductor layer SEM2. The second semiconductor layer SEM2 may be formed as a semiconductor layer doped with p-type impurities. The second electrode E2 may be a cathode CAT of the light-emitting element ED. The second electrode E2 may be formed of a conductive material, for example, a transparent conductive material such as indium tin oxide (ITO) or indium zinc oxide (IZO), or an opaque conductive material such as titanium (Ti), gold (Au), silver (Ag), copper (Cu), or an alloy thereof.

The light-emitting element ED may include an encapsulation layer ENS. The encapsulation layer ENS covers the semiconductor patterns SEM1 and SEM2 and the electrodes E1 and E2 to protect the light-emitting element ED. The encapsulation layer ENS and a third planarization layer PLN3 include contact holes exposing the first electrode E1 and the second electrode E2. The anode AND is connected to the reflective layer RF through a first contact hole passing through the encapsulation layer ENS and the third planarization layer PLN3. The cathode CAT is connected to the second electrode E2 through a second contact hole passing through the encapsulation layer ENS and the third planarization layer PLN3. Meanwhile, a portion of a side surface of the first semiconductor pattern SEM1 may be exposed since the encapsulation layer ENS is not present thereon.

A second planarization layer PLN2 and the third planarization layer PLN3 may cover the adhesive layer AD and the light-emitting element ED. The second planarization layer PLN2 is in contact with a lower end of a side surface of the light-emitting element ED and fixes the light-emitting element ED. The third planarization layer PLN3 covers the light-emitting element ED, on the second planarization layer PLN2. The third planarization layer PLN3 includes contact holes exposing the first electrode E1 and the second electrode E2 of the light-emitting element ED. The second planarization layer PLN2 and the third planarization layer PLN3 may be formed of a single or multiple layers of an organic insulating material, for example, photoresist or an acryl-based organic material.

A pattern of a sixth metal layer may be disposed on the third planarization layer PLN3. The sixth metal layer may include the anode AND and the cathode CAT. The anode AND electrically connects the first electrode E1 of the light-emitting element ED and the reflective layer RF. The anode AND may be connected to the first electrode E1 of the light-emitting element ED through the contact holes passing through the insulating layers PLN3 and ENS and may be connected to the reflective layer RF through contact holes passing through the insulating layers PAS2, AD, PLN2, and PLN3.

The cathode CAT is connected to the second electrode E2 of the light-emitting element ED through the contact holes passing through the insulating layers PLN3 and ENS. The cathode CAT may be connected to a low-potential power line CL.

According to the embodiment, the light-emitting element ED is illustrated as having a horizontal structure in which the electrodes are connected to upper surfaces of the first semiconductor pattern SEM1 and the second semiconductor pattern SEM2, but the present invention is not necessarily limited thereto. As an example, the light-emitting element ED may have a vertical structure in which the anode AND is disposed below the first semiconductor pattern SEM1.

A bank pattern BB may be disposed on the second planarization layer PLN2. The bank pattern BB may be spaced apart from the light-emitting element ED by a certain distance. The bank pattern BB may cover a portion of the anode AND present in the contact hole passing through the insulating layers PLN2 and PLN3. The bank pattern BB may prevent optical crosstalk between the sub-pixels SP to reduce color mixing between the sub-pixels SP. To this end, the bank pattern BB may be formed of a black resin, but the present invention is not limited thereto.

A first protective layer CPA may cover the sixth metal layer, the bank pattern BB, the second planarization layer PLN2, and the third planarization layer PLN3. The first protective layer CPA may be formed of a single layer of transparent epoxy, silicon oxide (SiOx), or silicon nitride (SiNx), a multi-layered insulating layer, or the like.

Each of the first pad electrodes PAD1 disposed in the pad areas PA1 and PA2 of the first substrate SUBS1 may have a multi-layered metal layer structure. For example, each of the first pad electrodes PAD1 may include a first pad metal layer PE1a, a second pad metal layer PE1b, and a third pad metal layer PE1c, which are stacked on the outermost periphery of a front surface of the first substrate SUBS1.

The pattern of the third metal layer disposed on the second interlayer insulating layer ILD2 may further include the first pad metal layer PE1a. The first pad metal layer PE1a may be formed of the same metal as the source electrode SE and the drain electrode DE of the driving element DT, such as copper (Cu), aluminum (Al), molybdenum (Mo), nickel (Ni), titanium (Ti), chromium (Cr), or multi-layered metal layers.

The pattern of the fifth metal layer disposed on the first planarization layer PLN1 may further include the second pad metal layer PE1b. The second pad metal layer PE1b may be formed of the same metal as the reflective layer RF, for example, silver (Ag), aluminum (Al), molybdenum (Mo), or multi-layered metal layers.

The pattern of the sixth metal layer disposed on the third planarization layer PLN3 may further include the third pad metal layer PE1c. The third pad metal layer PE1c may be formed of the same conductive material as the anode AND and the cathode CAT, for example, a transparent conductive material such as indium tin oxide (ITO) or indium zinc oxide (IZO), or a multi-layered metal layer.

A first metal layer ML1, a second metal layer ML2, and a plurality of insulating layers may be disposed below the first pad electrodes PAD1. By disposing the first and second metal layers ML1 and ML2 and the plurality of insulating layers below the first pad electrode PAD1, a step difference of the first pad electrode PAD1 can be adjusted. For example, the buffer layer BUF, the gate insulating layer GI, the first metal layer ML1, the first interlayer insulating layer ILD1, and the second metal layer ML2 may be sequentially disposed between the first pad electrode PAD1 and the first substrate SUBS1. The pattern of the second metal layer disposed on the gate insulating layer GI may include the first metal layer ML1. The pattern of the fourth metal layer disposed on the first interlayer insulating layer ILD1 may include the second metal layer ML2. The plurality of insulating layers and the metal layers ML1 and ML2 below the first pad electrodes PAD1 are not limited to those shown in FIG. 5.

A second substrate SUBS2 may be disposed on a rear surface of the first substrate SUBS1. A bonding layer BDL is disposed between the first substrate SUBS1 and the second substrate SUBS2. The bonding layer BDL is cured through various curing methods to bond the first substrate SUBS1 and the second substrate SUBS2. The bonding layer BDL may be disposed only in a partial area or the entire area between the first substrate SUBS1 and the second substrate SUBS2. The first substrate SUBS1 and the second substrate SUBS2 may be simultaneously scribed and ground such that side surfaces of the first substrate SUBS1 and the second substrate SUBS2 may be formed with no step.

A plurality of second pad electrodes PAD2 may be disposed on the outermost periphery of a rear surface of the second substrate SUBS2. The second pad electrodes PAD2 are electrically connected to side lines SRL and the first pad electrode PAD1 to transmit signals from circuit elements disposed on the rear surface of the second substrate SUBS2 to the sub-pixels SP disposed on an upper surface of the first substrate SUBS1.

Each of the second pad electrodes PAD2 may have a multi-layered metal layer structure. For example, each of the second pad electrodes PAD2 may include a first pad metal layer PE2a, a second pad metal layer PE2b, and a third pad metal layer PE2c, which are stacked on the outermost periphery of the rear surface of the second substrate SUBS2. Each of the first and second pad metal layers PE2a and PE2b may be formed of copper (Cu), aluminum (Al), molybdenum (Mo), nickel (Ni), titanium (Ti), chromium (Cr), or a multi-layered metal layer. The third pad metal layer PE2c may be formed of a transparent conductive material such as indium tin oxide (ITO) or indium zinc oxide (IZO).

A second protective layer BCL may be disposed on the rear surface of the second substrate SUBS2. The second protective layer BCL may cover various lines except for the second pad electrodes PAD2, on the rear surface of the second substrate SUBS2. The second protective layer BCL may be made of an organic insulating material, for example, benzocyclobutene or an acryl-based organic insulating material.

Circuit elements such as a plurality of flexible films, a PCB, and the like may be disposed on a rear surface side of the second substrate SUBS2. Output terminals of the flexible film are electrically connected to the second pad electrode PAD2, and input terminals of the flexible film are electrically connected to output terminals of the PCB. Thus, signals or voltages output from the PCB may be transmitted to the sub-pixel SP disposed on the front surface of the first substrate SUBS1 via the flexible film, the second pad electrode PAD2, the side line SRL, the plurality of first pad electrodes PAD1, and lines connected to the first pad electrode PAD1.

The side lines SRL cross the side surfaces of the first substrate SUBS1 and the second substrate SUBS2, and electrically connect the first pad electrodes PAD1 and the second pad electrodes PAD2. The side lines SRL may be formed on the side surfaces of the first substrate SUBS1 and the second substrate SUBS2 by a pad printing method using conductive ink containing silver (Ag), copper (Cu), molybdenum (Mo), chromium (Cr), or the like.

A side insulating layer SDI may cover the side lines SRL formed on the outermost peripheries of the upper, side, and rear surfaces of the first substrate SUBS1 and the second substrate SUBS2, which are bonded to each other. When the side lines SRL are made of metal, external light may be reflected from the side lines SRL, or light emitted from the light-emitting element ED may be reflected from the side lines SRL and be visually recognized by a user. To improve image quality degradation caused by such reflected light, the side insulating layer SDI may include a black material that absorbs external light. For example, the side insulating layer SDI may be formed on the outermost peripheries of the first substrate SUBS1 and the second substrate SUBS2 using black ink that can be applied by printing.

A sealing layer SS may cover the side insulating layer SDI to protect the display panel PN from external shock, moisture, oxygen, and the like. For example, the sealing layer SS may be made of black ink, polyimide (PI), polyurethane (PU), epoxy, an acryl-based insulating material, and the like.

The sealing layer SS may be a concept including the side insulating layer SDI. That is, the sealing layer SS and the side insulating layer SDI may be configured as one layer.

A cover film MF may cover the front surface of the display panel PN. The cover film MF may include one or more of various functional films, such as an anti-scattering film, an anti-glare film, an anti-reflecting film, a low-reflecting film, an organic light-emitting diode (OLED) transmittance controllable film, a color difference compensation film, a polarizing plate, and the like. The anti-scattering film prevents substrate fragments or particles from scattering when the display panel PN is broken. By widely adhering the sealing layer SS to the front surface of the first substrate SUBS1 and then cutting along a cut line overlapping the sealing layer SS, the cover film MF may be cut and removed along with the outer portion of the sealing layer SS. As a result, the exposed outermost side surfaces of the cover film MF and the sealing layer SS may form the same plane without a step.

Figure 6:
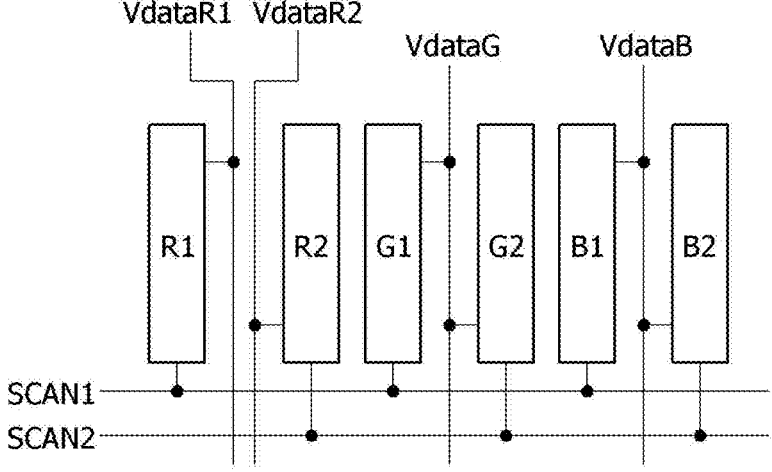
FIG. 6 is a diagram illustrating a pixel structure according to one embodiment of the present specification.
Figure 7:
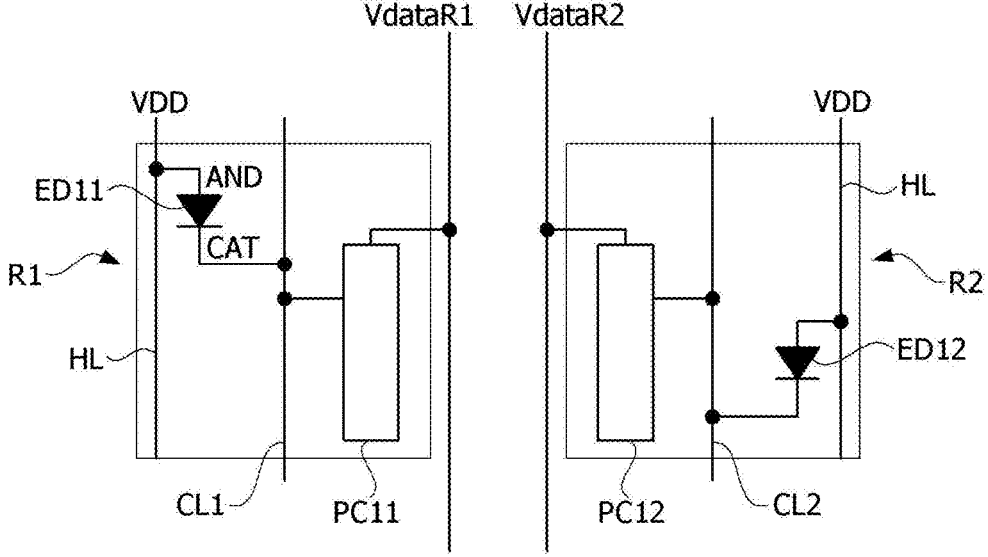
FIG. 7 is a diagram illustrating a red sub-pixel according to one embodiment of the present specification.
Figure 8:
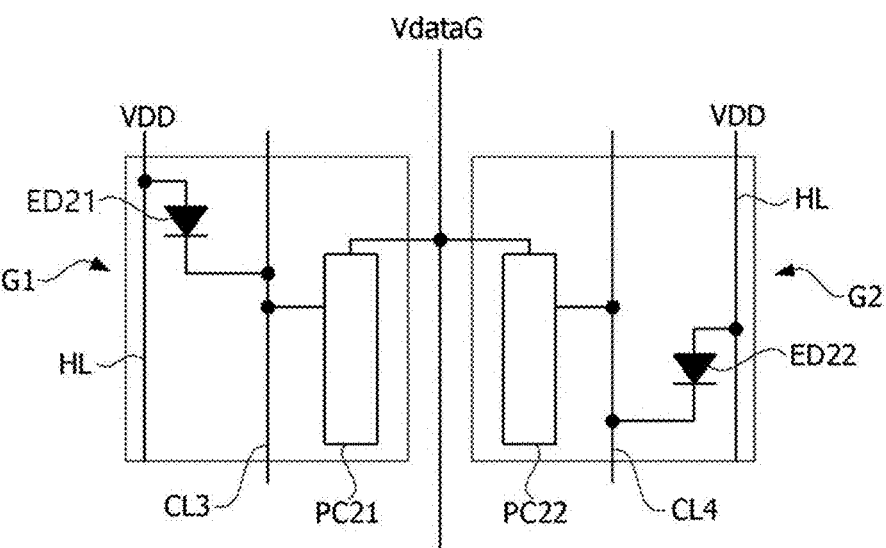
FIG. 8 is a diagram illustrating a green sub-pixel according to one embodiment of the present specification.
Figure 9:
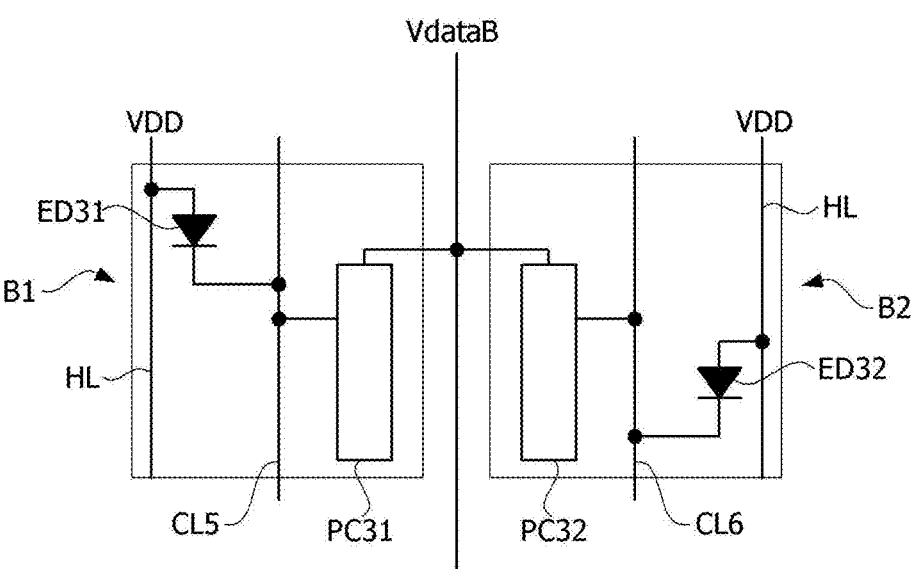
FIG. 9 is a diagram illustrating a blue sub-pixel according to one embodiment of the present specification.
Figure 10:
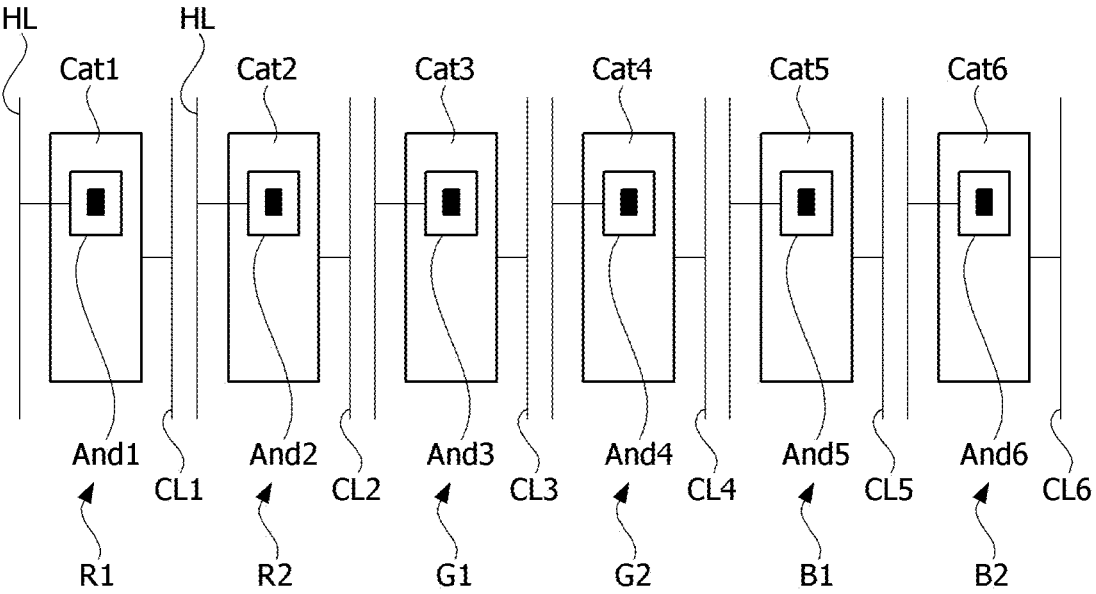
FIG. 10 is a diagram illustrating cathodes of the red sub-pixel, the green sub-pixel, and the blue sub-pixel according to one embodiment of the present specification.

FIG. 6 is a diagram illustrating a pixel according to one embodiment of the present specification. FIG. 7 is a diagram illustrating a red sub-pixel according to one embodiment of the present specification. FIG. 8 is a diagram illustrating a green sub-pixel according to one embodiment of the present specification. FIG. 9 is a diagram illustrating a blue sub-pixel according to one embodiment of the present specification. FIG. 10 is a diagram illustrating cathodes of the red sub-pixel, the green sub-pixel, and the blue sub-pixel according to one embodiment of the present specification.

Referring to FIG. 6, the pixel may include six sub-pixels. As an example, the pixel may include two red sub-pixels R1 and R2, two green sub-pixels G1 and G2, and two blue sub-pixels B1 and B2. Each of the sub-pixels may include a light-emitting element and a pixel circuit including a compensation circuit. The compensation circuit is a circuit for compensating a threshold voltage of a driving element, and the pixel circuit may be a circuit including the light-emitting element, the driving element, and the compensation circuit. When a sub-pixel includes two light-emitting elements and one compensation circuit, the sub-pixel may be defined as one sub-pixel.

According to the embodiment, each of the sub-pixels R1, R2, G1, G2, B1, and B2 may be driven independently or simultaneously. A plurality of sub-pixels R1, R2, G1, G2, B1, and B2 may be simultaneously driven by sharing a gate line. However, the present invention is not necessarily limited thereto, and a plurality of gate lines may be configured, such that a first pixel group of pixels R1, G1, and B1 connected to a first gate line SCAN1 and a second pixel group of pixels R2, G2, and B2 connected to a second gate line SCAN2 may be driven independently.

The two red sub-pixels R1 and R2 may be connected to data lines VdataR1 and VdataR2, respectively. On the other hand, the two green sub-pixels G1 and G2 may share one data line VdataG, and the two blue sub-pixels B1 and B2 may share one data line VdataB. Accordingly, the number of data lines can be reduced.

The red sub-pixels R1 and R2 have relatively low efficiency and thus may be driven independently to adjust luminance thereof, while the green sub-pixels G1 and G2 and the blue sub-pixels B1 and B2 have relatively high efficiency and thus may simultaneously emit light using one data line.

In this case, since two light-emitting elements are turned on simultaneously by one data voltage, it is advantageous to output a desired luminance even when a data voltage is lowered. However, the present invention is not necessarily limited thereto, and the green sub-pixels and the blue sub-pixels may also be separately connected to the data lines and independently driven.

Referring to FIG. 7, the red sub-pixels may include a first red sub-pixel (1-1 sub-pixel) R1 and a second red sub-pixel (1-2 subpixel) R2. The first red sub-pixel R1 may include a first red light-emitting element ED11 and a first red compensation circuit PC11. The first red light-emitting element ED11 may be connected to an anode AND connected to a high-potential power line HL, and a cathode CAT connected to a low-potential power line CL1. The first red compensation circuit PC11 may be connected between a first data line VdataR1 and the low-potential power line CL1.

The second red sub-pixel R2 may include a second red light-emitting element ED12 and a second red compensation circuit PC12. The second red light-emitting element ED12 may be connected to an anode connected to the high-potential power line HL, and a cathode connected to a low-potential power line CL2. The second red compensation circuit PC12 may be connected between a second data line VdataR2 and the low-potential power line CL2.

According to the embodiment, the first red sub-pixel R1 and the second red sub-pixel R2 are respectively connected to the first data line VdataR1 and the second data line VdataR2, and thus can be driven independently. Thus, when voltage levels applied to the first data line VdataR1 and the second data line VdataR2 are adjusted differently, the first red light-emitting element ED11 and the second red light-emitting element ED12 may emit light with different luminances. That is, the luminances of the first red light-emitting element ED11 and the second red light-emitting element ED12 may be independently controlled according to the total luminance of red light to be output from the pixel. Alternatively, the first red light-emitting element ED11 and the second red light-emitting element ED12 may be alternately driven. However, the present invention is not necessarily limited thereto, and the first red sub-pixel R1 and the second red sub-pixel R2 may be simultaneously driven through one data line. Since each of the first red sub-pixel R1 and the second red sub-pixel R2 is configured as an independent pixel, even when one of the first red sub-pixel R1 and the second red sub-pixel R2 experiences a short-circuit failure, this failure may not affect the other one.

Referring to FIG. 8, the green sub-pixels may include a first green sub-pixel (2-1 sub-pixel) G1 and a second green sub-pixel (2-2 sub-pixel) G2. The first green sub-pixel G1 may include a first green light-emitting element ED21 and a first green compensation circuit PC21. The first green light-emitting element ED21 may be connected to an anode connected to the high-potential power line HL, and a cathode connected to a low-potential power line CL3. The first green compensation circuit PC21 may be connected between a third data line VdataG and the low-potential power line CL3.

The second green sub-pixel G2 may include a second green light-emitting element ED22 and a second green compensation circuit PC22. The second green light-emitting element ED22 may be connected to an anode connected to the high-potential power line HL, and a cathode connected to a low-potential power line CLA. The second green compensation circuit PC22 may be connected between the third data line VdataG and the low-potential power line CL4.

According to the embodiment, the first green sub-pixel G1 and the second green sub-pixel G2 are connected in common to the third data line VdataG and thus may be driven simultaneously. Accordingly, the data voltage may be set relatively low. For example, when a data voltage to be applied to output a predetermined luminance for the green sub-pixel in the corresponding frame is 1 V, since two green light-emitting elements emit light, even when the data voltage is lowered to 0.5 V and applied, a desired luminance of green light can be output.

As an example, in the case of a second pixel in which one of the first green sub-pixel G1 and the second green sub-pixel G2 has failed, only one sub-pixel is used to adjust the luminance, and thus, it is necessary to apply twice the data voltage compared to a first pixel, in which both sub-pixels emit light, to adjust so that the same luminance is achieved.

According to the embodiment, the anode of the first green light-emitting element ED21 and the anode of the second green light-emitting element ED22 may be electrically separated from each other, and the cathode of the first green light-emitting element ED21 and the cathode of the second green light-emitting element ED22 may be electrically separated from each other. Accordingly, even when a high-potential voltage VDD and a low-potential voltage VSS are short-circuited due to a failure in the first green light-emitting element ED21, and the first green light-emitting element ED21 is darkened, the adjacent second green light-emitting element ED22 is not affected.

The failure in the first green light-emitting element ED21 may be a failure in the electrode pad or a failure due to an inherent defect in the semiconductor layer itself. Micro-sized light-emitting diodes are small in size and thus vulnerable to static electricity and are fabricated on a wafer in a micro-scale and then transferred to a panel, and thus subject to a high failure rate due to various reasons.

Accordingly, in a case in which the first green light-emitting element ED21 and the second green light-emitting element ED22 are connected in series or parallel, when one of the light-emitting elements experiences a short-circuit failure, in which the high-potential voltage VDD and the low-potential voltage VSS are short-circuited, and is darkened, the normal light-emitting element adjacent thereto may also turn into a dark spot due to the flow of a short-circuit current. However, according to the embodiment, since the anode and cathode of the first green light-emitting element ED21 are separated from the anode and cathode of the second green light-emitting element ED22, even when one of the light-emitting elements experiences a short-circuit failure, the adjacent light-emitting element may be prevented from being darkened. Accordingly, the adjacent light-emitting elements can operate normally.

Referring to FIG. 9, the blue sub-pixels may include a first blue sub-pixel (3-1 sub-pixel) B1 and a second blue sub-pixel (3-2 sub-pixel) B2. The first blue sub-pixel B1 may include a first blue light-emitting element ED31 and a first blue compensation circuit PC31. The first blue light-emitting element ED31 may be connected to an anode connected to the high-potential power line HL, and a cathode connected to a low-potential power line CL5. The first blue compensation circuit PC31 may be connected between a fourth data line VdataB and the low-potential power line CL5.

The second blue sub-pixel B2 may include a second blue light-emitting element ED32 and a second blue compensation circuit PC32. The second blue light-emitting element ED32 may be connected to an anode connected to the high-potential power line HL, and a cathode connected to a low-potential power line CL6. The second blue compensation circuit PC32 may be connected between the fourth data line VdataB and the low-potential power line CL6.

According to the embodiment, the first blue sub-pixel B1 and the second blue sub-pixel B2 are connected in common to the fourth data line VdataB, and thus may be driven simultaneously. Accordingly, the data voltage may be set lower than a voltage level for one blue light-emitting element to emit light with a desired luminance.

As an example, in the case of a fourth pixel in which one of the first blue sub-pixel B1 and the second blue sub-pixel B2 has failed, only one sub-pixel is used to adjust the luminance, and thus, it is necessary to apply twice the data voltage compared to a third pixel, in which both sub-pixels emit light, to adjust so that the same luminance is achieved.

In addition, the anode of the first blue light-emitting element ED31 and the anode of the second blue light-emitting element ED32 may be electrically separated from each other, and the cathode of the first blue light-emitting element ED31 and the cathode of the second blue light-emitting element ED32 may be electrically separated from each other. Thus, even when one of the light-emitting elements experiences a short-circuit failure, the case in which the adjacent light-emitting element is also darkened can be prevented.

Referring to FIG. 10, in the pixel, an anode And1 of the first red sub-pixel R1, an anode And2 of the second red sub-pixel R2, an anode And3 of the first green sub-pixel G1, an anode And4 of the second green sub-pixel G2, an anode And5 of the first blue sub-pixel B1, and an anode And6 of the second blue sub-pixel B2 may be electrically separated from each other.

In addition, a cathode Cat1 of the first red sub-pixel R1, a cathode Cat2 of the second red sub-pixel R2, a cathode Cat3 of the first green sub-pixel G1, a cathode Cat4 of the second green sub-pixel G2, a cathode Cat5 of the first blue sub-pixel B1, and a cathode Cat6 of the second blue sub-pixel B2 may be electrically separated from each other.

In addition, a plurality of high-potential power lines HL respectively connected to the anodes And1 to And6 may be separated from each other, and a plurality of low-potential power lines CL respectively connected to the cathodes Cat1 to Cat6 may also be separated from each other. Accordingly, it is possible to prevent the light-emitting element of the adjacent sub-pixel from being darkened due to a short-circuit failure in the light-emitting element of any one of the plurality of sub-pixels.

Figure 11:
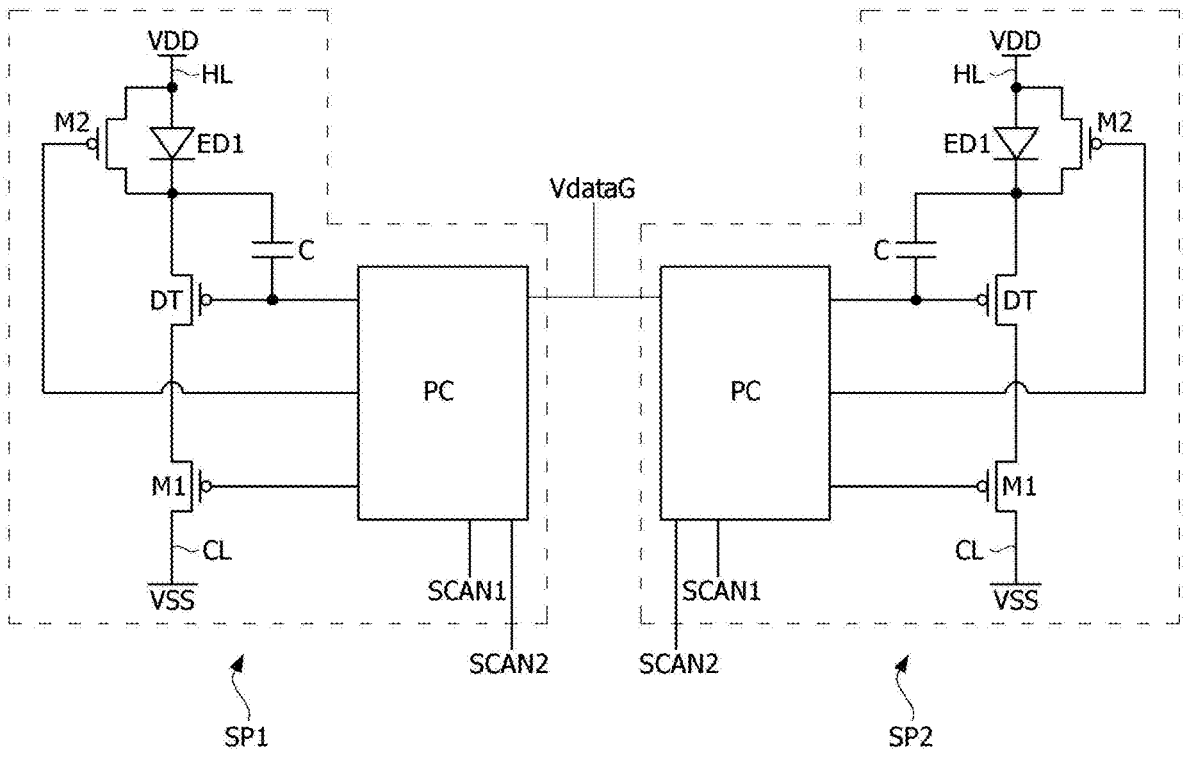
FIG. 11 is a circuit diagram schematically illustrating a pixel circuit according to one embodiment of the present specification.
Figure 12:
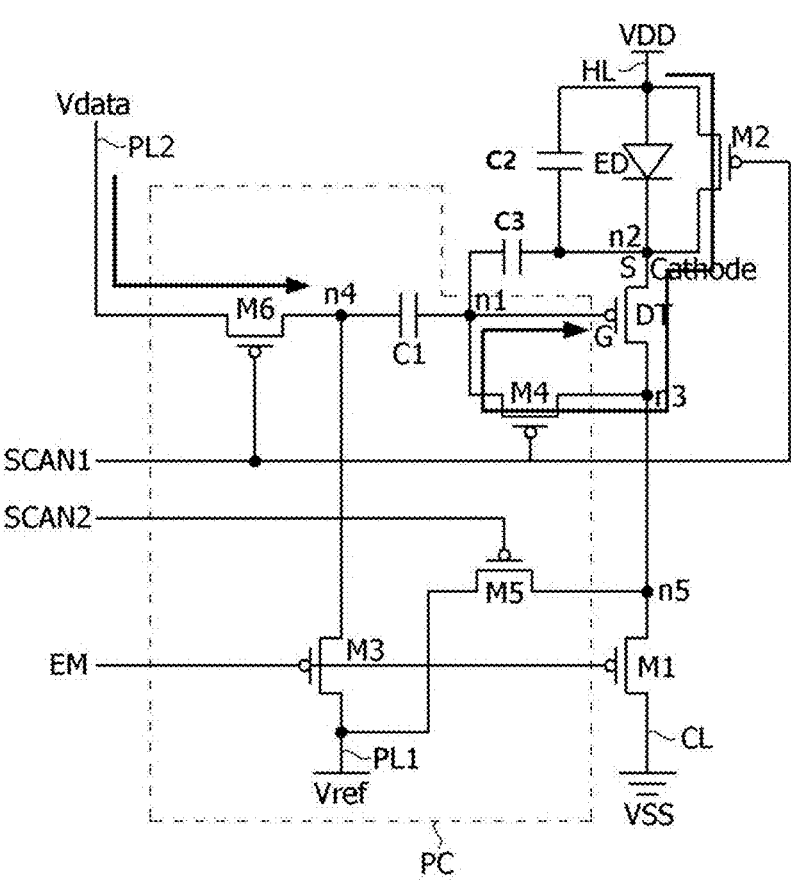
FIG. 12 is a circuit diagram illustrating a pixel circuit according to another embodiment of the present specification.

FIG. 11 is a circuit diagram illustrating a schematic pixel circuit according to one embodiment of the present specification. FIG. 12 is a circuit diagram illustrating a pixel circuit according to one embodiment of the present specification.

Referring to FIG. 11, sub-pixels SP1 and SP2 of the same color each include a light-emitting element ED, a driving element DT, a first switch element M1, and a compensation circuit PC, respectively. The sub-pixels SP1 and SP2 of the same color may be green or blue sub-pixels.

Since the two sub-pixels SP1 and SP2 have the same structure with a data line PL2, to which a data voltage Vdata is applied, interposed therebetween, a pixel circuitry of each sub-pixel is described by the same reference numerals. Hereinafter, descriptions will be made based on a second sub-pixel SP2 disposed on the right.

The second sub-pixel SP2 may include the light-emitting element ED, the driving element DT, the first switch element M1, and the compensation circuit PC. The light-emitting element ED, the driving element DT, and the first switch element M1 may be connected in series between a high-potential voltage VDD and a low-potential voltage VSS.

The driving element DT adjusts a current, which flows through a drain-source channel, according to a gate-source voltage. The gate-source voltage of the driving element DT varies depending on the data voltage Vdata of pixel data applied to a gate electrode of the driving element DT. Accordingly, the current flowing through the driving element DT varies according to the data voltage Vdata. The light-emitting element ED may be driven by the current flowing from the driving element DT to emit light. A capacitor C may be connected between the gate electrode and a first electrode of the driving element DT. The capacitor C is charged with the gate-source voltage of the driving element DT.

The driving element DT may be connected between the light-emitting element ED and the first switch element M1. In this case, the driving element DT includes the gate electrode to which the data voltage Vdata is applied, the first electrode connected to a cathode of the light-emitting element ED, and a second electrode connected to a first electrode of the first switch element M1.

The first switch element M1 switches a current path between the high-potential voltage VDD and the low-potential voltage VSS. The first switch element M1 may be turned on in response to a gate-on voltage of one of gate signals GATE1 and GATE2 and may be turned off in response to a gate-off voltage of one of gate signals GATE1 and GATE2. When the first switch element M1 is turned on, the driving element DT and the light-emitting element ED are electrically connected to each other, so that a current may be supplied to the light-emitting element ED. When the first switch element M1 is turned off, the current path between the high-potential voltage VDD and the low-potential voltage VSS is blocked, and thus, the current is not supplied to the light-emitting element ED.

The first switch element M1 may be connected between the driving element DT and a cathode voltage VSS. In this case, the first switch element M1 includes a gate electrode connected to a first gate line, the first electrode connected to the second electrode of the driving element DT, and a second electrode connected to a node to which the cathode voltage VSS is applied.

The pixel circuit may further include a second switch element M2. The second switch element M2 is connected between the cathode and an anode of the light-emitting element ED and may be turned on in response to the gate signal applied through the compensation circuit. When the second switch element M2 is turned on, the cathode and the anode of the light-emitting element ED are short-circuited, and thus the light-emitting element ED does not emit light. The second switch element M2 may prevent the light-emitting element ED from emitting light, when the pixel circuit is initialized and a threshold voltage of the driving element DT is sampled. The second switch element M2 includes a gate electrode connected to a second gate line, a first electrode connected to the anode of the light-emitting element ED, and a second electrode connected to the cathode of the light-emitting element ED.

The first switch element M1 may be turned on in response to a gate-on voltage of a light-emitting signal and turned off in response to a gate-off voltage of the light-emitting signal, but the present invention is not limited thereto. The second switch element M2 may be turned on in response to a gate-on voltage of a first scan signal and turned off in response to a gate-off voltage of the first scan signal, but the present invention is not limited thereto.

The compensation circuit PC is connected to a data line to which the data voltage Vdata is applied, a gate line to which one or more scan signals SCAN1 and SCAN2 are applied, the gate electrode of the driving element DT, and the gate electrode of the first switch element M1. One or more scan signals SCAN1 and SCAN2 may be applied to the compensation circuit.

The compensation circuit PC transfers the data voltage Vdata to the gate electrode of the driving element DT by using a plurality of transistors. The compensation circuit PC samples the threshold voltage of the driving element DT to the capacitor C and compensates a gate voltage of the driving element DT by the threshold voltage of the driving element DT. The compensation circuit PC may compensate for the threshold voltage of the driving element DT using a source follower or a diode connection circuit.

Referring to FIG. 12, the pixel circuit may include a driving element DT connected to a light-emitting element ED, a plurality of switch elements M1 to M6, and a plurality of capacitors C1 to C3. The driving element DT and the plurality of switch elements M1 to M6 may be P-channel transistors, but the present invention is not necessarily limited thereto.

The driving element DT may have a gate electrode G connected to a first node n1, a source electrode S connected to a second node n2, and a drain electrode D connected to a third node n3.

The light-emitting element ED may be disposed between the second node n2 and a high-potential voltage VDD. The light-emitting element ED may be a micro-sized light-emitting diode, but the present invention is not necessarily limited thereto. The source electrode S of the driving element DT may be connected to a cathode of the light-emitting element ED.

The first switch element M1 may be connected between the third node n3 of the driving element DT and a low-potential voltage VSS. When the first switch element M1 is turned on in response to a gate-on voltage of a light-emitting signal EM, the first switch element M1 may connect the third node n3 and the low-potential voltage VSS.

The second switch element M2 is connected between the cathode and an anode of the light-emitting element ED and may be turned on by a gate-on voltage of a first scan signal SCAN1. When the second switch element M2 is turned on, the light-emitting element does not emit light.

A third switch element M3 is connected between a reference voltage line PL1 and a fourth node n4, and when the third switch element M3 is turned on in response to the gate-on voltage of the light-emitting signal EM, a reference voltage Vref may be applied to the fourth node n4.

A fourth switch element M4 is disposed between the third node n3 and the first node n1, and when the fourth switch element M4 is turned on in response to the gate-on voltage of the first scan signal SCAN1, the third node n3 may be connected to the first node n1.

A fifth switch element M5 is disposed between the reference voltage line PL1 and a fifth node n5, and when the fifth switch element M5 is turned on in response to a gate-on voltage of a second scan signal SCAN2, the reference voltage Vref may be applied to the fifth node n5.

A sixth switch element M6 is disposed between the data line PL2 and the fourth node n4, and when the sixth switch element M6 is turned on in response to the gate-on voltage of the first scan signal SCAN1, a data voltage Vdata may be applied to the fourth node n4.

A first capacitor C1 may be disposed between the first node n1 and the fourth node n4, and a second capacitor C2 may be disposed between the first node n1 and the second node n2, and a third capacitor C3 may be disposed between the second capacitor C2 and the anode of the light-emitting element ED. A threshold voltage of the driving element and the data voltage may be stored in the second capacitor C2 and the third capacitor C3, respectively.

Figure 13:
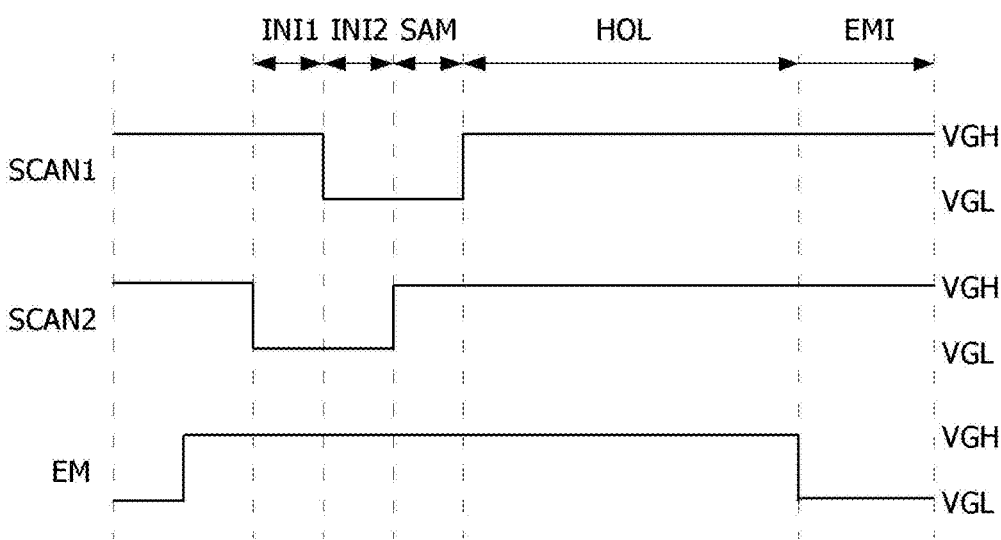
FIG. 13 is a waveform diagram of the pixel circuit according to another embodiment of the present specification.

Referring to FIG. 13, in a first initialization period INI1, the first scan signal SCAN1 may be output as a gate-off voltage VGH, and the second scan signal SCAN2 may be output as a gate-on voltage VGL. The fifth switch element M5 to which the second scan signal SCAN2 is applied may be turned on and the reference voltage may be applied to the third node n3. The reference voltage Vref applied during an emission period of a previous frame may remain at the first node n1, and the reference voltage Vref may be applied to the third node n3.

In a second initialization period INI2, both the first scan signal SCAN1 and the second scan signal SCAN2 are output as gate-on voltages VGL, so that the second switch element M2, the fourth switch element M4, the fifth switch element M5, and the sixth switch element M6 may be turned on. Accordingly, the data voltage Vdata may be charged to the first node n1, and the reference voltage Vref may be charged to the first node n1, so that the first capacitor C1 may be initialized. In addition, the gate electrode of the driving element DT may be initialized to the reference voltage Vref. In this case, since the second switch element M2 is turned on, the cathode and the anode of the light-emitting element ED may be short-circuited, and thus, the light-emitting element ED may not emit light.

In a sampling period SAM, the first scan signal SCAN1 has the gate-on voltage VGL and the second scan signal SCAN2 has the gate-off voltage VGH, so that the sixth switch element M6, the fourth switch element M4, and the second switch element M2 may be turned on. Thus, a voltage of VDD+Vth may be stored at the first node n1.

In a hold period HOL, the first scan signal SCAN1, the second scan signal SCAN2, and the light-emitting signal EM all have the gate-off voltage VGH, and thus, all the switch elements may be turned off. Accordingly, the voltage of VDD+Vth may remain at the first node n1.

In an emission period EMI, the first scan signal SCAN1 and the second scan signal SCAN2 may have the gate-off voltage VGH, and the light-emitting signal EM may have the gate-on voltage VGL. The first switch element M1 and the third switch element M3 may be turned on. Accordingly, the reference voltage Vref may be applied to the first node n1, and due to capacitor coupling, a voltage of VDD+Vth−(Vdata−Vref) may be applied to the first node n1.

A current Ids flowing through the driving element DT may be defined as k(IVgsl−IVthl)2. Thus, given k(VDD−VDD−Vth+Vdata−Vref+Vth)2, the expression may be simplified to k(Vdata−Vref)2. Accordingly, the threshold voltage of the driving element may be compensated.

Figure 14:
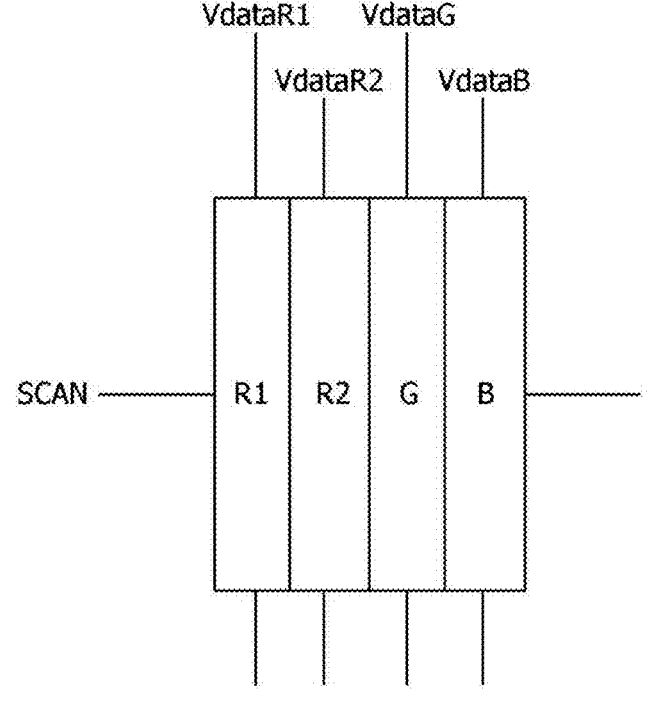
FIG. 14 is a diagram illustrating a pixel with sub-pixels connected in parallel according to one embodiment of the present specification.
Figure 15:
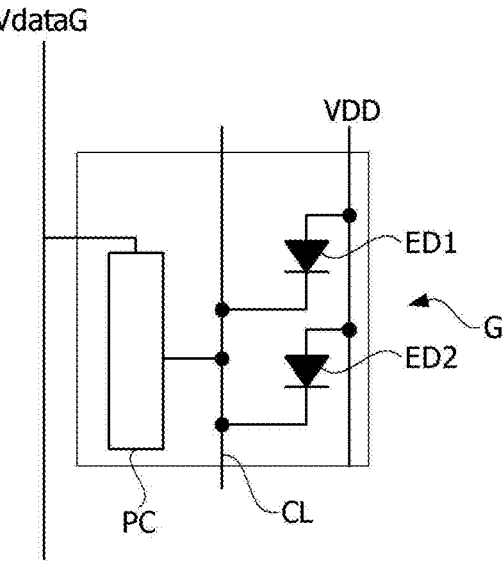
FIG. 15 is a diagram illustrating the sub-pixel of FIG. 14 according to one embodiment of the present specification.

FIG. 14 is a diagram illustrating a pixel with sub-pixels connected in parallel according to one embodiment. FIG. 15 is a diagram illustrating the sub-pixel of FIG. 14 according to one embodiment.

Referring to FIGS. 14 and 15, the pixel may include four sub-pixels R1, R2, G, and B. That is, the pixel may include a first red sub-pixel R1, a second red sub-pixel R2, a green sub-pixel G, and a blue sub-pixel B.

The first red sub-pixel R1 and the second red sub-pixel R2 may each include a light-emitting element ED and a compensation circuit PC, in the same structure as described in FIG. 7. However, the green sub-pixel G may have two green light-emitting elements ED disposed in parallel, and the two green light-emitting elements ED may share one compensation circuit PC. In addition, the red sub-pixel R may have two red light-emitting elements ED disposed in parallel, and the two red light-emitting elements ED may share one compensation circuit PC. With this structure, the number of compensation circuits can be reduced, thereby increasing an aperture ratio.

However, since two green light-emitting elements ED1 and ED2 are connected in parallel, there is a problem that, when one of the light-emitting elements experiences a short-circuit failure and is darkened, the adjacent light-emitting element is also short-circuited and darkened. Accordingly, there is a problem that all the green light-emitting elements ED1 and ED2 in the corresponding pixel are darkened.

Figure 16:
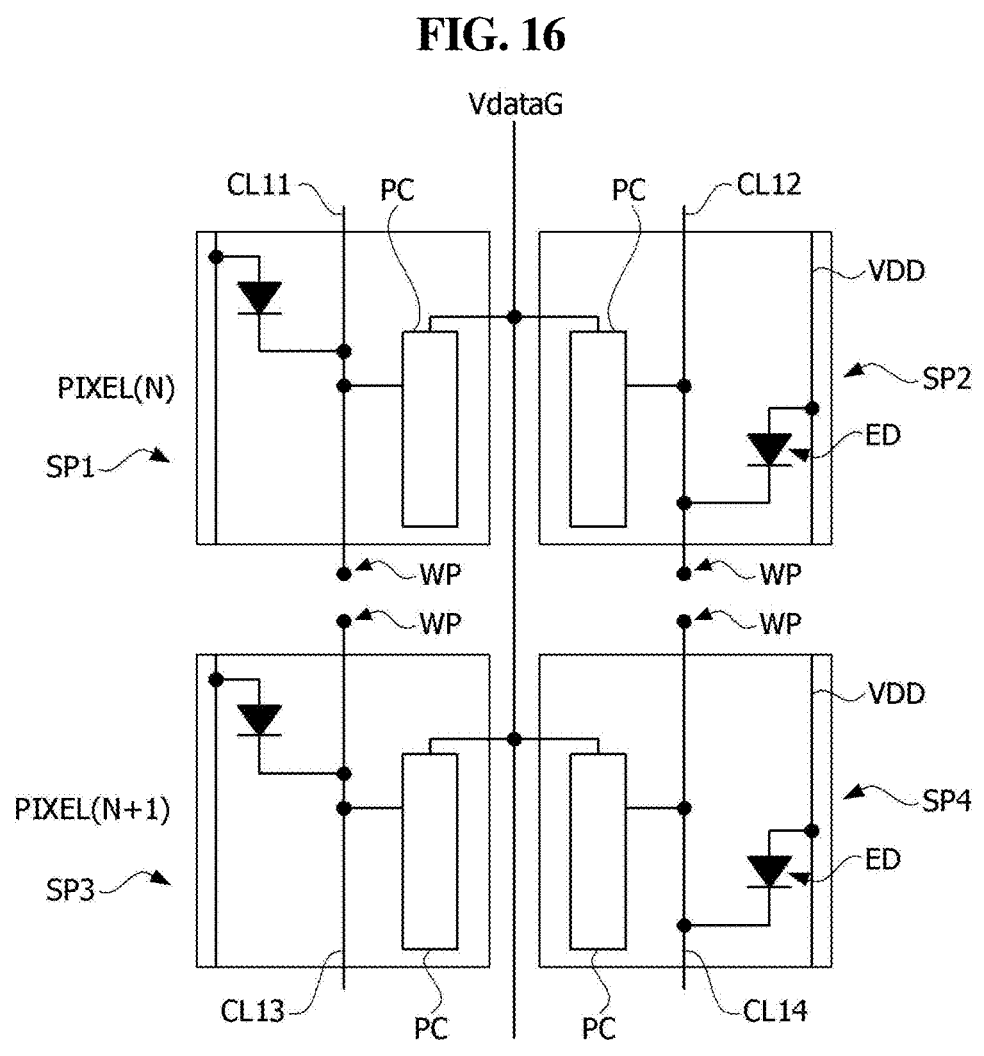
Figure 17:
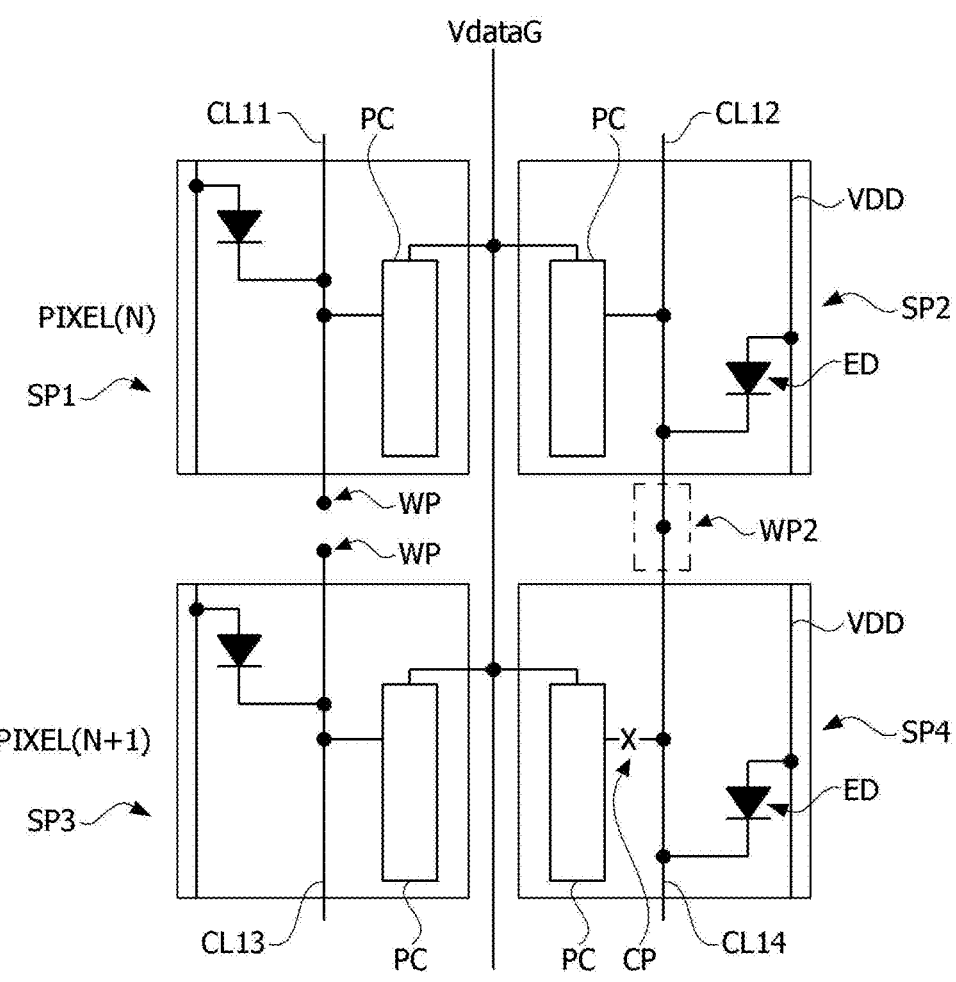

FIGS. 16 and 17 are diagrams illustrating a process of repairing sub-pixels according to one embodiment.

Referring to FIG. 16, a plurality of pixels may include a first pixel PIXEL(N) disposed on a first pixel line and a second pixel PIXEL(N+1) disposed on a second pixel line. The first pixel PIXEL(N) may include a first sub-pixel SP1 and a second sub-pixel SP2 of the same color, and the second pixel PIXEL(N+1) may include a third sub-pixel SP3 and a fourth sub-pixel SP4 of the same color. The first pixel line and the second pixel line may be adjacent to each other in the column direction (the Y-axis direction), but the present invention is not limited thereto.

The first sub-pixel SP1, the second sub-pixel SP2, the third sub-pixel SP3, and the fourth sub-pixel SP4 each include a light-emitting element ED, a compensation circuit PC, and a high-potential power line HL, and a low-potential power line CL.

The first sub-pixel SP1 may be disposed to face the third sub-pixel SP3 in the column direction, and the second sub-pixel SP2 may be disposed to face the fourth sub-pixel SP4 in the column direction.

A low-potential power line CL11 disposed in the first sub-pixel SP1 may extend toward the third sub-pixel SP3, and a low-potential power line CL13 disposed in the third sub-pixel SP3 may extend toward the first sub-pixel SP1. In addition, a low-potential power line CL12 disposed in the second sub-pixel SP2 may extend toward the fourth sub-pixel SP4, and a low-potential power line CL14 disposed in the fourth sub-pixel SP4 may extend toward the second sub-pixel SP2.

A welding portion WP may be formed at an end of each of the low-potential power line CL11, CL12, CL13, and CL14 extending outside of each sub-pixel. The welding portion WP includes metal layers that overlap each other with an insulating layer interposed therebetween and may be selectively connected in a welding process.

Referring to FIG. 17, when the compensation circuit PC of the fourth sub-pixel SP4 fails, a repair portion WP2 may be formed by connecting the welding portion WP of the low-potential power line CL14 of the fourth sub-pixel SP4 to the welding portion WP of the low-potential power line CL12 of the second sub-pixel SP2. Thus, in this case, the welding portion WP may be connected after electrically disconnecting the light-emitting element ED from the compensation circuit PC in the fourth sub-pixel SP4. With this configuration, when the compensation circuit of each sub-pixel fails, the compensation circuit can be connected to the compensation circuit of the adjacent sub-pixel and can operate normally.

A display panel and a display device including the same according to one embodiment of the present specification may be described as follows.

The display panel according to one embodiment of the present specification includes a plurality of pixels, and a gate line and a data line that are connected to the plurality of pixels, wherein each of the plurality of pixels includes a 1-1 sub-pixel and a 1-2 sub-pixel of a first color, a 2-1 sub-pixel and a 2-2 sub-pixel of a second color, and a 3-1 sub-pixel and a 3-2 sub-pixel of a third color, wherein each of the 2-1 sub-pixel and the 2-2 sub-pixel includes a light-emitting element and a compensation circuit, and the compensation circuit of the 2-1 sub-pixel and the compensation circuit of the 2-2 sub-pixel are connected to one data line.

According to one or more embodiments of the present specification, the 1-1 sub-pixel may include a first compensation circuit connected to a first data line, and the 1-2 sub-pixel may include a second compensation circuit connected to a second data line.

According to one or more embodiments of the present specification, each of the 3-1 sub-pixel and the 3-2 sub-pixel may include a compensation circuit, and the compensation circuits of the 3-1 sub-pixel and the 3-2 sub-pixel may be connected to one data line.

According to one or more embodiments of the present specification, the first color may be red, the second color may be green, and the third color may be blue.

According to one or more embodiments of the present specification, the plurality of pixels may include a first pixel in which both the 2-1 sub-pixel and the 2-2 sub-pixel emit light when a data voltage is applied, and a second pixel in which only one of the 2-1 sub-pixel and the 2-2 sub-pixel emits light when the data voltage is applied.

According to one or more embodiments of the present specification, the data voltage applied to the 2-1 sub-pixel and the 2-2 sub-pixel of the second pixel may be greater than the data voltage applied to the 2-1 sub-pixel and the 2-2 sub-pixel of the first pixel.

According to one or more embodiments of the present specification, the plurality of pixels may include a third pixel in which both the 3-1 sub-pixel and the 3-2 sub-pixel emit light when a data voltage is applied, and a fourth pixel in which only one of the 3-1 sub-pixel and the 3-2 sub-pixel emits light when the data voltage is applied.

According to one or more embodiments of the present specification, the data voltage applied to the 3-1 sub-pixel and the 3-2 sub-pixel of the fourth pixel may be greater than the data voltage applied to the 3-1 sub-pixel and the 3-2 sub-pixel of the third pixel.

According to one or more embodiments of the present specification, the display panel may include a first gate line to which the 1-1 sub-pixel, the 2-1 sub-pixel, and the 3-1 sub-pixel are connected, and a second gate line to which the 1-2 sub-pixel, the 2-2 sub-pixel, and the 3-2 sub-pixel are connected.

According to one or more embodiments of the present specification, each of the 1-1 to 3-2 sub-pixels may include an anode and a cathode that apply a voltage to the light-emitting element, the anodes of the 1-1 to 3-2 sub-pixels may be separated from each other, and the cathodes of the 1-1 to 3-2 sub-pixels may be separated from each other.

According to one or more embodiments of the present specification, the compensation circuit of the 2-1 sub-pixel and the compensation circuit of the 2-2 sub-pixel may have the same structure.

According to one or more embodiments of the present specification, the plurality of pixels may include a plurality of first pixels disposed in a first pixel line, and a plurality of second pixels disposed in a second pixel line adjacent to the first pixel line, the 2-1 sub-pixel of the first pixel may include a first low-potential power line connected to a first cathode of the 2-1 sub-pixel of the first pixel, the 2-1 sub-pixel of the second pixel may include a second low-potential power line connected to a second cathode of the 2-1 sub-pixel of the second pixel, the first low-potential power line may extend toward the second cathode, the second low-potential power line may extend toward the first cathode, and the first low-potential power line and the second low-potential power line may be electrically connected to each other.

According to one or more embodiments of the present specification, the first low-potential power line of the 2-1 sub-pixel of the first pixel may be electrically connected to the compensation circuit of the 2-1 sub-pixel of the second pixel.

According to one or more embodiments of the present specification, a first compensation circuit of the 1-1 sub-pixel may be connected between a first data line and a first low-potential line, and a second compensation circuit of the 1-2 sub-pixel may be connected between a second data line and a second low-potential line.

A display device according to one embodiment of the present specification includes a display panel including a plurality of pixels, and a gate line and a data line that are connected to the plurality of pixels, a gate driver connected to the gate line, and a data driver connected to the data line, wherein each of the plurality of pixels includes a 1-1 sub-pixel and a 1-2 sub-pixel of a first color, a 2-1 sub-pixel and a 2-2 sub-pixel of a second color, and a 3-1 sub-pixel and a 3-2 sub-pixel of a third color, wherein each of the 2-1 sub-pixel and the 2-2 sub-pixel may include a light-emitting element and a compensation circuit, and the compensation circuit of the 2-1 sub-pixel and the compensation circuit of the 2-2 sub-pixel are connected to one data line.

According to one or more embodiments of the present specification, the 1-1 sub-pixel may include a first compensation circuit connected to a first data line, and the 1-2 sub-pixel may include a second compensation circuit connected to a second data line.

According to one or more embodiments of the present specification, each of the 3-1 sub-pixel and the 3-2 sub-pixel may include a compensation circuit, and the compensation circuits of the 3-1 sub-pixel and the 3-2 sub-pixel may be connected to one data line.

According to one or more embodiments of the present specification, the first color may be red, the second color may be green, and the third color may be blue.

According to one or more embodiments of the present specification, the plurality of pixels may include a first pixel in which both the 2-1 sub-pixel and the 2-2 sub-pixel emit light when a data voltage is applied, and a second pixel in which only one of the 2-1 sub-pixel and the 2-2 sub-pixel emits light when the data voltage is applied.

According to one or more embodiments of the present specification, the data voltage applied to the 2-1 sub-pixel and the 2-2 sub-pixel of the second pixel may be greater than the data voltage applied to the 2-1 sub-pixel and the 2-2 sub-pixel of the first pixel.

A display device according to the embodiment of the present specification may be applicable to a mobile device, a video phone, a smart watch, a watch phone, a wearable apparatus, a foldable apparatus, a rollable apparatus, a bendable apparatus, a flexible apparatus, a curved apparatus, a sliding apparatus, a variable apparatus, an electronic organizer, an electronic book, a portable multimedia player (PMP), a personal digital assistant (PDA), an MP3 player, a mobile medical apparatus, a desktop PC, a laptop PC, a netbook computer, a workstation, a navigation system, a navigation system for a vehicle, a display device for a vehicle, an apparatus for a vehicle, a theater apparatus, a theater display device, a television, a wallpaper device, a signage device, a game device, a notebook, a monitor, a camera, a camcorder, a consumer electronics device, and the like.

According to the present specification, even when one of light-emitting elements of a plurality of sub-pixels is darkened, the remaining light-emitting elements can emit light. Accordingly, the number of dark spots in the light-emitting elements of a display device can be reduced. In addition, low-power operation becomes possible.

Further, by using a pixel structure that facilitates the improvement of dark spots, a display panel that is advantageous for process optimization, high efficiency, high luminance, and a long lifespan can be implemented.

It should be noted that advantageous effects of the present specification are not limited to the above-described effects, and other effects that are not described herein will be apparent to those skilled in the art from the following descriptions.

While the embodiments of the present specification and their advantages have been described in detail with reference to the accompanying drawings, it will be apparent to those skilled in the art to which the present specification belongs that various changes, substitutions, and alterations may be made herein without departing from the scope of the present specification. Accordingly, the scope of the present specification will be defined by the following claims rather than the above-detailed description, and all changes and modifications derived from the meaning and the scope of the claims and equivalents thereof should be understood as being included in the scope of the present specification.

What is claimed is:

1. A display panel comprising:
   a plurality of pixels; and
   a gate line and a data line that are connected to the plurality of pixels,
   wherein each of the plurality of pixels includes:
      a 1-1 sub-pixel and a 1-2 sub-pixel of a first color;
      a 2-1 sub-pixel and a 2-2 sub-pixel of a second color; and
      a 3-1 sub-pixel and a 3-2 sub-pixel of a third color,
      wherein each of the 2-1 sub-pixel and the 2-2 sub-pixel includes a light-emitting element and a compensation circuit,
      the compensation circuit of the 2-1 sub-pixel and the compensation circuit of the 2-2 sub-pixel are connected to one data line,
      the 1-1 sub-pixel includes a first compensation circuit connected to a first data line and the 1-2 sub-pixel includes a second compensation circuit connected to a second data line, and
      the first compensation circuit of the 1-1 sub-pixel is connected to the first data line and a first low-potential line and the second compensation circuit of the 1-2 sub-pixel is connected to the second data line and a second low-potential line.

2. The display panel of claim 1, wherein each of the 3-1 sub-pixel and the 3-2 sub-pixel includes a compensation circuit and compensation circuits of the 3-1 sub-pixel and the 3-2 sub-pixel are connected to one data line.

3. The display panel of claim 1, wherein the first color is red, the second color is green, and the third color is blue.

4. The display panel of claim 1, wherein the plurality of pixels include:
   a first pixel in which both the 2-1 sub-pixel and the 2-2 sub-pixel emit light when a data voltage is applied; and a second pixel in which one of the 2-1 sub-pixel and the 2-2 sub-pixel emits light when the data voltage is applied.

5. The display panel of claim 4, wherein a data voltage applied to the 2-1 sub-pixel and the 2-2 sub-pixel of the second pixel is greater than a data voltage applied to the 2-1 sub-pixel and the 2-2 sub-pixel of the first pixel.

6. The display panel of claim 4, wherein the plurality of pixels include:
   a third pixel in which both the 3-1 sub-pixel and the 3-2 sub-pixel emit light when a data voltage is applied; and
   a fourth pixel in which one of the 3-1 sub-pixel and the 3-2 sub-pixel emits light when the data voltage is applied.

7. The display panel of claim 6, wherein a data voltage applied to the 3-1 sub-pixel and the 3-2 sub-pixel of the fourth pixel is greater than a data voltage applied to the 3-1 sub-pixel and the 3-2 sub-pixel of the third pixel.

8. The display panel of claim 1, comprising:
   a first gate line to which the 1-1 sub-pixel, the 2-1 sub-pixel, and the 3-1 sub-pixel are connected; and
   a second gate line to which the 1-2 sub-pixel, the 2-2 sub-pixel, and the 3-2 sub-pixel are connected.

9. The display panel of claim 1, wherein each of the 1-1 sub-pixel to the 3-2 sub-pixel includes an anode and a cathode that apply a voltage to the light-emitting element,
   wherein anodes of the 1-1 sub-pixel to the 3-2 sub-pixel are separated from each other and cathodes of the 1-1 sub-pixel to the 3-2 sub-pixel are separated from each other.

10. The display panel of claim 1, wherein the compensation circuit of the 2-1 sub-pixel and the compensation circuit of the 2-2 sub-pixel have a same structure.

11. The display panel of claim 1, wherein the plurality of pixels include a plurality of first pixels in a first pixel line, and a plurality of second pixels in a second pixel line adjacent to the first pixel line,
   each of the plurality of first pixels includes a first sub-pixel and a second sub-pixel of the second color,
   each of the plurality of second pixels includes a third sub-pixel and a fourth sub-pixel of the second color,
   the first sub-pixel of the first pixel includes a first low-potential power line connected to a first cathode of the first sub-pixel of the first pixel,
   the third sub-pixel of the second pixel includes a third low-potential power line connected to a third cathode of the third sub-pixel of the second pixel,
   the first low-potential power line extends toward the third sub-pixel,
   the third low-potential power line extends toward the first sub-pixel, and
   the first low-potential power line and the second third low-potential power line are electrically connected to each other.

12. The display panel of claim 11, wherein the first low-potential power line of the third sub-pixel of the second pixel is electrically connected to the compensation circuit of the first sub-pixel of the first pixel.

13. A display device comprising:
   a display panel including a plurality of pixels and a gate line and a data line that are connected to the plurality of pixels;
   a gate driver connected to the gate line; and
   a data driver connected to the data line,
   wherein each of the plurality of pixels includes:
      a 1-1 sub-pixel and a 1-2 sub-pixel of a first color;

a 2-1 sub-pixel and a 2-2 sub-pixel of a second color; and a 3-1 sub-pixel and a 3-2 sub-pixel of a third color, wherein each of the 2-1 sub-pixel and the 2-2 sub-pixel includes a light-emitting element and a compensation circuit, the compensation circuit of the 2-1 sub-pixel and the compensation circuit of the 2-2 sub-pixel are connected to one data line, the 1-1 sub-pixel includes a first compensation circuit connected to a first data line and the 1-2 sub-pixel includes a second compensation circuit connected to a second data line, and the first compensation circuit of the 1-1 sub-pixel is connected to the first data line and a first low-potential line and the second compensation circuit of the 1-2 sub-pixel is connected to the second data line and a second low-potential line.

14. The display device of claim 13, wherein each of the 3-1 sub-pixel and the 3-2 sub-pixel includes a compensation circuit, and compensation circuits of the 3-1 sub-pixel and the 3-2 sub-pixel are connected to one data line.

15. The display device of claim 13, wherein the first color is red, the second color is green, and the third color is blue.

16. The display device of claim 13, wherein the plurality of pixels include:

a first pixel in which both the 2-1 sub-pixel and the 2-2 sub-pixel emit light when a data voltage is applied; and a second pixel in which one of the 2-1 sub-pixel and the 2-2 sub-pixel emits light when the data voltage is applied.

17. The display device of claim 16, wherein the data voltage applied to the 2-1 sub-pixel and the 2-2 sub-pixel of the second pixel is greater than the data voltage applied to the 2-1 sub-pixel and the 2-2 sub-pixel of the first pixel.

* * * * *